United States Patent
Oh et al.

(10) Patent No.: US 10,268,434 B2
(45) Date of Patent: Apr. 23, 2019

(54) MOBILE TERMINAL AND CONTROL METHOD THEREFOR

(71) Applicant: LG ELECTRONICS INC., Seoul (KR)

(72) Inventors: Sesook Oh, Seoul (KR); Kyunghye Seo, Seoul (KR); Sungjin Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 15/533,976

(22) PCT Filed: Nov. 18, 2015

(86) PCT No.: PCT/KR2015/012378
§ 371 (c)(1),
(2) Date: Jun. 7, 2017

(87) PCT Pub. No.: WO2016/093506
PCT Pub. Date: Jun. 16, 2016

(65) Prior Publication Data
US 2017/0344329 A1 Nov. 30, 2017

(30) Foreign Application Priority Data
Dec. 8, 2014 (KR) ......................... 10-2014-0175055

(51) Int. Cl.
| G06F 3/14 | (2006.01) |
| H04W 4/12 | (2009.01) |
| H04W 88/02 | (2009.01) |
| G06F 3/0481 | (2013.01) |
| G06F 3/0482 | (2013.01) |

(Continued)

(52) U.S. Cl.
CPC .......... *G06F 3/1423* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 9,176,749 B2 * 11/2015 Kim ...................... G06F 3/0488
2006/0146765 A1 7/2006 Van De Sluis et al.
(Continued)

FOREIGN PATENT DOCUMENTS

| EP | 2306307 | 4/2011 |
| EP | 2571234 | 3/2013 |

(Continued)

OTHER PUBLICATIONS

PCT International Application No. PCT/KR2015/012378, Written Opinion of the International Searching Authority dated Feb. 24, 2016, 14 pages.
European Patent Office Application Serial No. 15867782.3, Search Report dated Jun. 8, 2018, 8 pages.

*Primary Examiner* — Kenneth B Lee, Jr.
(74) *Attorney, Agent, or Firm* — Lee, Hong, Degerman, Kang & Waimey

(57) ABSTRACT

The present invention relates to a mobile terminal, which can easily attach a content of another terminal to a message, and a control method therefor. To this end, the mobile terminal may comprise: a wireless communication unit for performing wireless communication with another terminal; a display unit including a first area for outputting first image data received from the another terminal and a second area for outputting second image data of the mobile terminal; and a control unit for controlling the mobile terminal such that, when at least one item is selected from at least one of a first content list of the another terminal and a second content list of the mobile terminal, a content corresponding to the selected item is attached to a message which is written through at least one of the first area and the second area.

20 Claims, 24 Drawing Sheets

(51) Int. Cl.
*G06F 3/0484* (2013.01)
*G06F 3/0486* (2013.01)
*G06F 3/0488* (2013.01)
*G06T 11/60* (2006.01)

(52) U.S. Cl.
CPC ........ *G06F 3/0488* (2013.01); *G06F 3/04817* (2013.01); *G06F 3/04842* (2013.01); *G06F 3/04845* (2013.01); *G06T 11/60* (2013.01); *H04W 4/12* (2013.01); *H04W 88/02* (2013.01); *G06F 2200/1614* (2013.01); *G06F 2203/0384* (2013.01); *G06F 2203/04803* (2013.01)

(56) References Cited

U.S. PATENT DOCUMENTS

| | | | |
|---|---|---|---|
| 2009/0265426 A1 | 10/2009 | Svendsen et al. | |
| 2010/0262673 A1 | 10/2010 | Chang et al. | |
| 2013/0201123 A1 | 8/2013 | Jung et al. | |
| 2014/0068469 A1* | 3/2014 | Lee | H04M 1/7253 715/761 |
| 2014/0320425 A1* | 10/2014 | Jeong | G06F 3/1454 345/173 |

FOREIGN PATENT DOCUMENTS

| | | |
|---|---|---|
| WO | 2012134150 | 10/2012 |
| WO | 2013109034 | 7/2013 |
| WO | 2014014215 | 1/2014 |
| WO | 2014042357 | 3/2014 |

* cited by examiner

FIG. 9
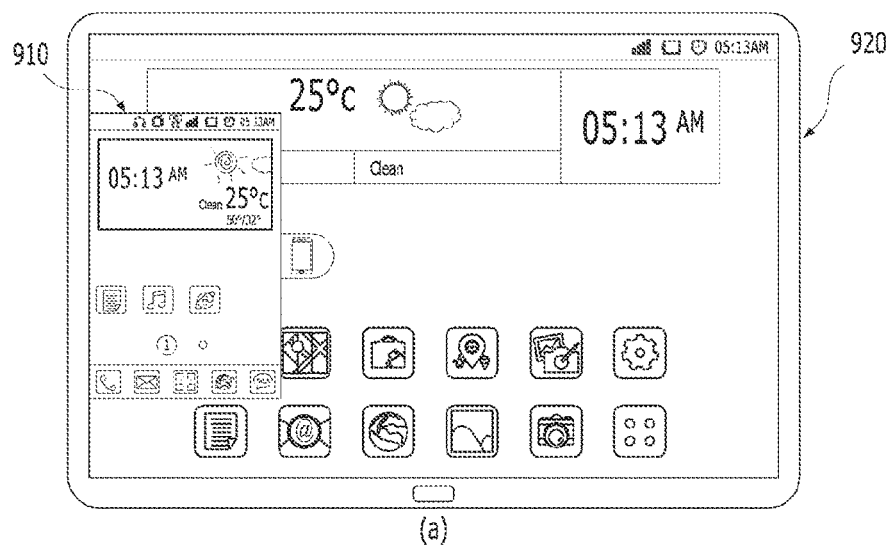
(a)
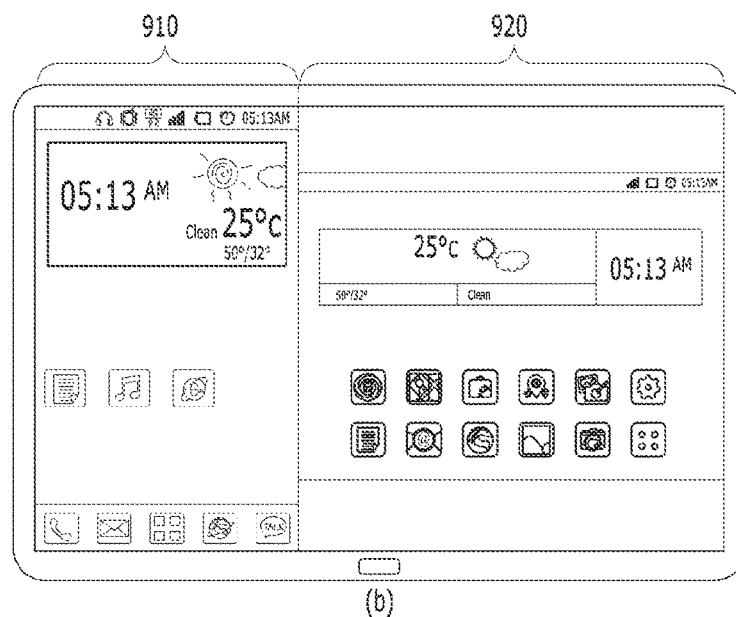
(b)

FIG. 10
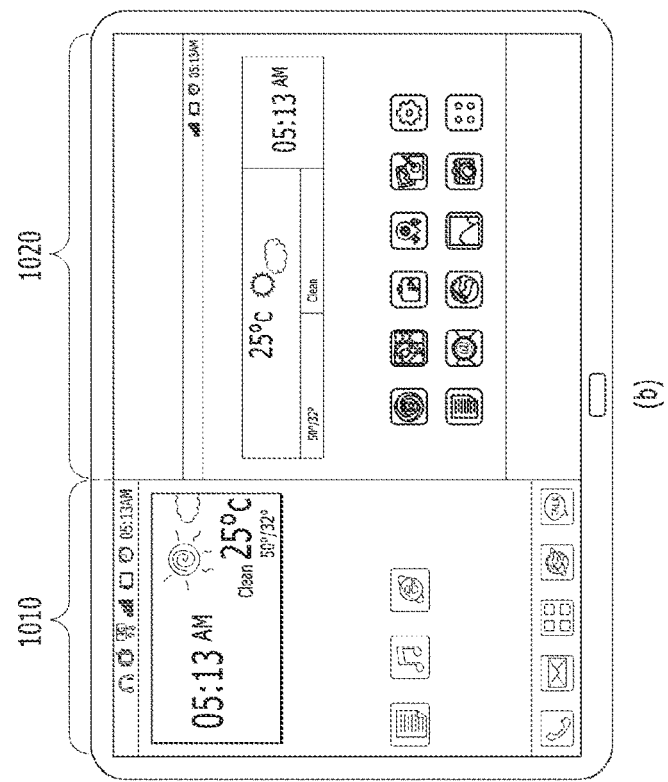
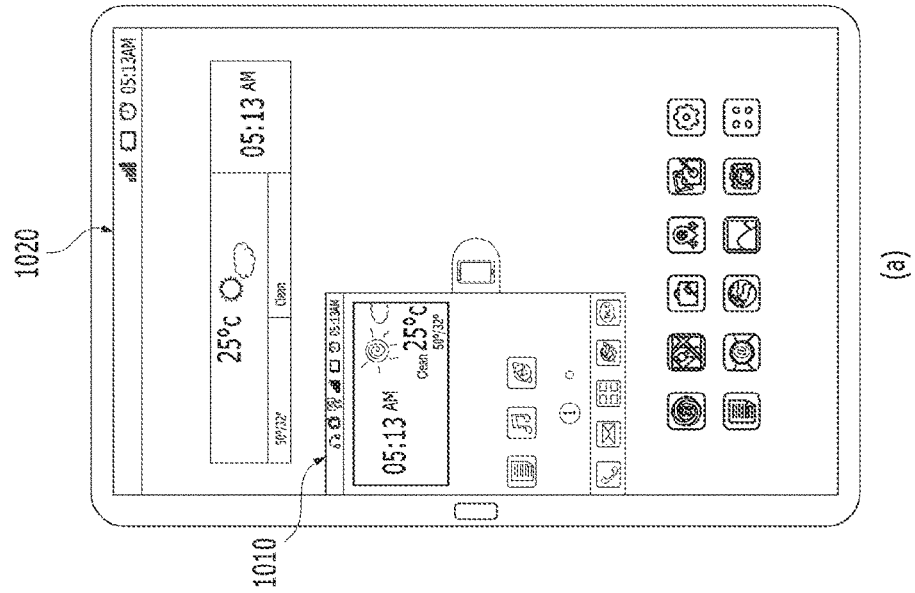

FIG. 18
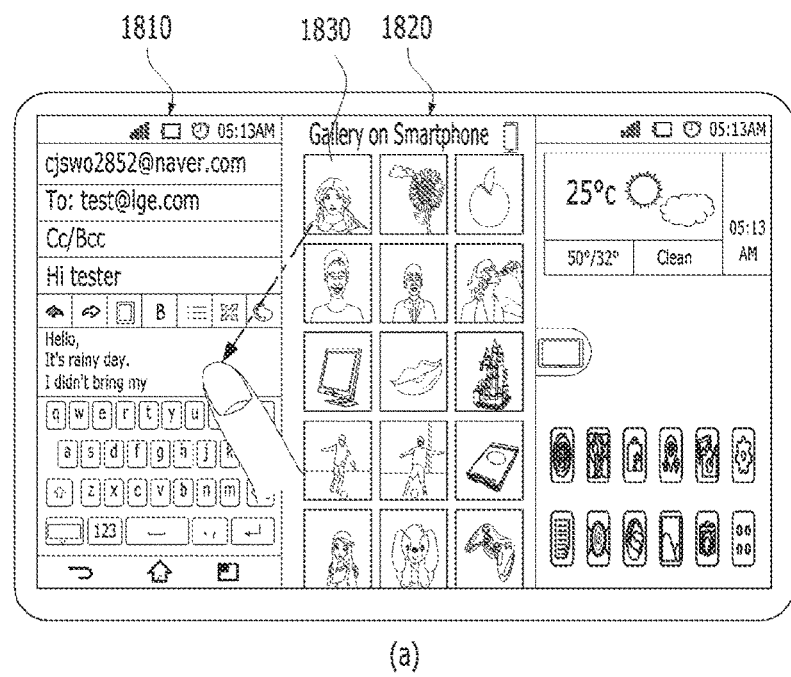
(a)
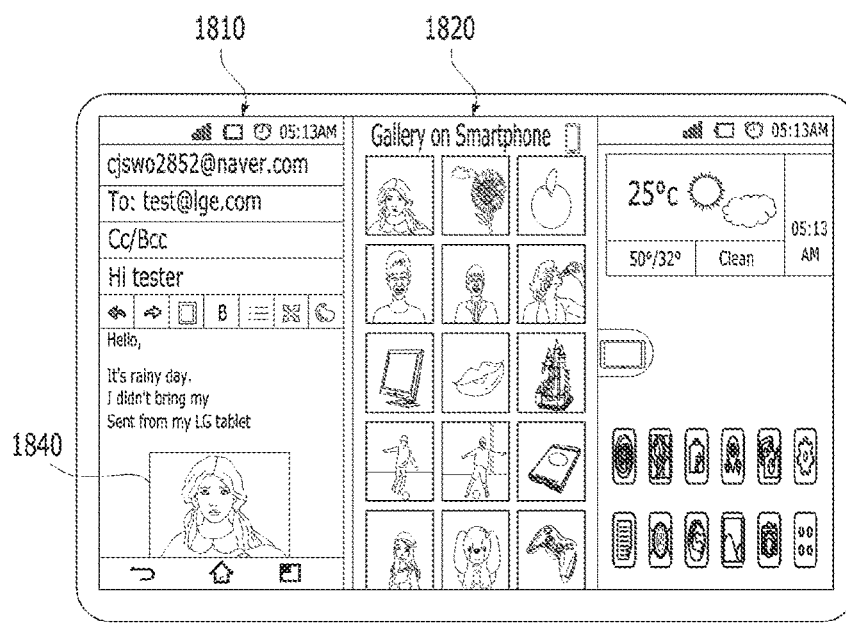
(b)

FIG. 19
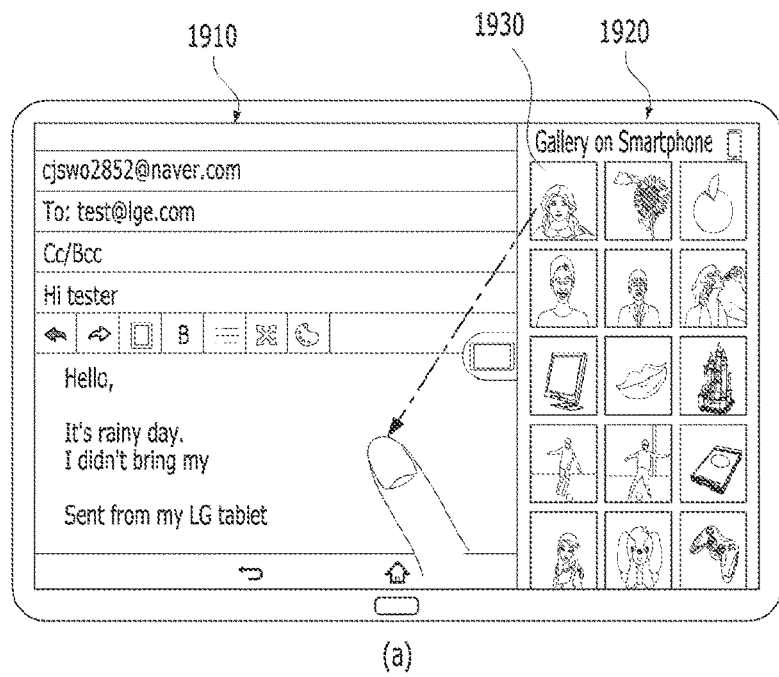
(a)
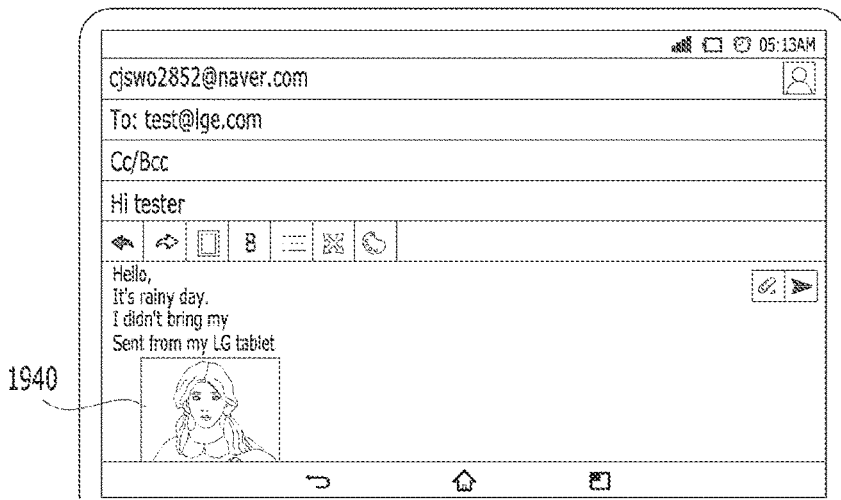
(b)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/012378, filed on Nov. 18, 2015, which claims the benefit of earlier filing date and right of priority to Korean Application No. 10-2014-0175055, filed on Dec. 8, 2014, the contents of which are all hereby incorporated by reference herein in their entirety.

TECHNICAL FIELD

The present invention relates to a mobile terminal capable of easily attaching a content of a different mobile terminal to a message and a method of controlling therefor.

RELATED ART

Generally, terminals can be classified into mobile/portable terminals and stationary terminals according to a presence or non-presence of mobility. And, the mobile terminals can be further classified into handheld terminals and vehicle mounted terminals according to availability for hand-carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the functions of the terminals are diversified, for example, the terminals are implemented in a form of a multimedia player equipped with complex functions such as capturing pictures or videos, playing music and video files, gaming, receiving broadcasting, and the like.

As functions of mobile terminals are diversified, communication between the mobile terminals has become a daily life. A mobile terminal transceive contents with another mobile terminal to share the contents with each other.

However, in order for the mobile terminal use contents stored in another mobile terminal, the mobile terminal should perform the steps of receiving the contents from another mobile terminal and selecting/executing the contents. Yet, when the mobile terminal receives the contents from another mobile terminal, since the received contents and contents previously stored in the mobile terminal are outputted in a manner of being mixed, it is not easy to find out the contents received from another mobile terminal.

Hence, the present invention proposes a mobile terminal capable of easily using contents stored in another mobile terminal and a method of controlling therefor.

DISCLOSURE OF THE INVENTION

Technical Tasks

One object of the present invention is to provide a mobile terminal capable of enhancing user convenience and a method of controlling therefor.

Specifically, one object of the present invention is to provide a mobile terminal capable of easily attaching contents stored in another mobile terminal to a message and a method of controlling therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a mobile terminal capable of performing wireless communication with a different terminal includes a wireless communication unit configured to perform the wireless communication with the different terminal, a display unit including a first area configured to output a first image data received from the different terminal and a second area configured to output a second image data of the mobile terminal, and a controller, if at least one item is selected from at least one of a first content list of the different terminal and a second content list of the mobile terminal, configured to control content corresponding to the selected item to be attached to a message written via one of the first area and the second area.

To further achieve these and other advantages and in accordance with the purpose of the present invention, according to a different embodiment, a method of controlling a mobile terminal capable of performing wireless communication with a different terminal, includes the steps of establishing a wireless communication channel with the different terminal, outputting a first image data received from the different terminal and a second image data of the mobile terminal, outputting at least one of a first content list of the first terminal and a second content list of the mobile terminal, and if at least one item is selected from at least one of the first content list and the second content list, attaching content corresponding to the selected item to a message written via one of the first area and the second area.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

Accordingly, the present invention provides the following effects or advantages.

According to one embodiment of the present invention, it is able to provide a mobile terminal capable of enhancing user convenience.

Specifically, it is able to provide a mobile terminal capable of easily attaching contents stored in another mobile terminal to a message and a method of controlling therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 9 is a diagram for explaining arrangement of a first area and a second area;

FIG. 10 is a diagram for an example of differently arranging a first area and a second area according to an orientation of a second terminal;

FIG. 18 is a diagram for an example of attaching contents to a message through a first area;

FIG. 19 is a diagram for an example of attaching contents to a message through a second area;

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
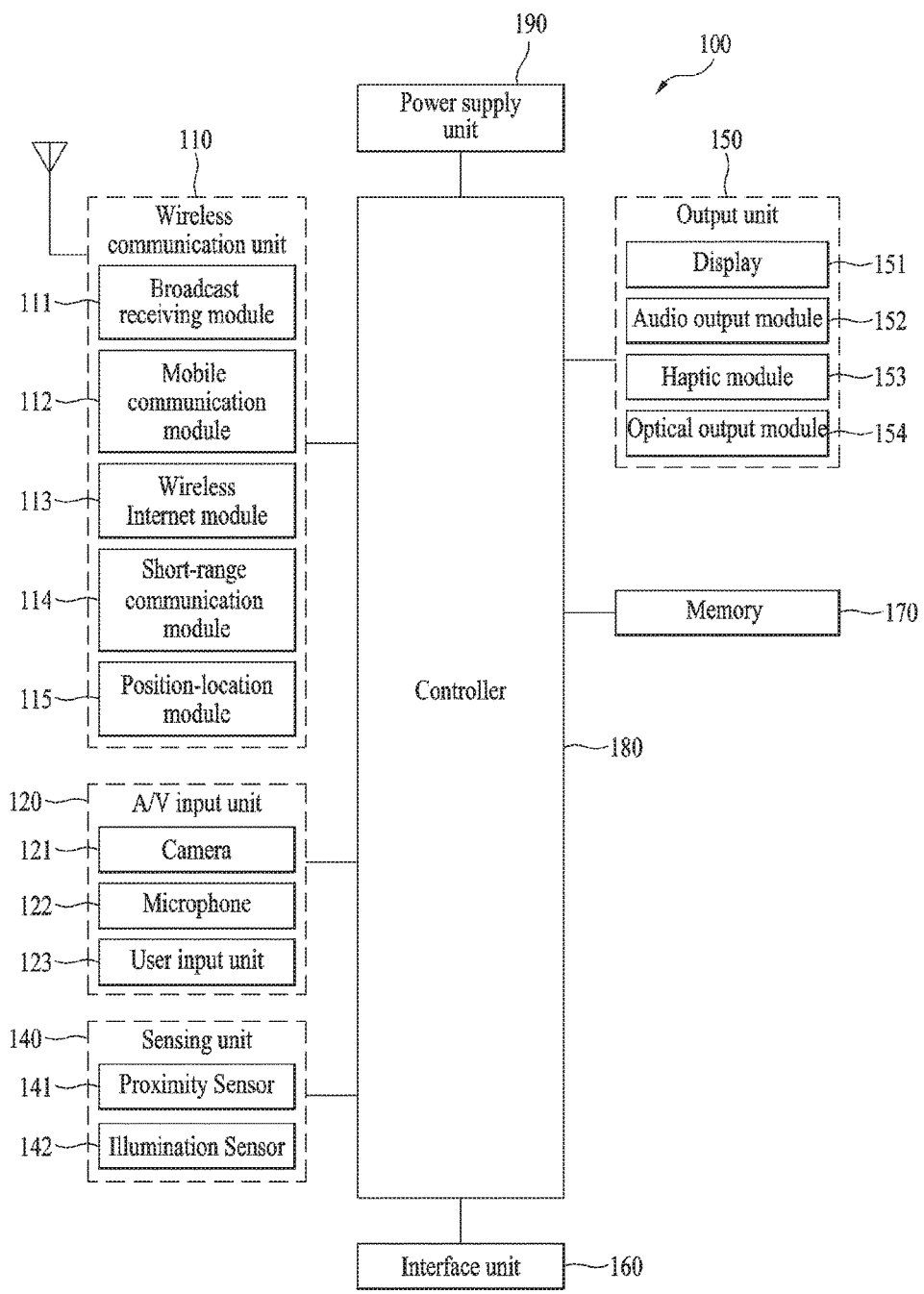
FIG. 1a is a block diagram for explaining a mobile terminal according to the present invention.
Figure 1B:
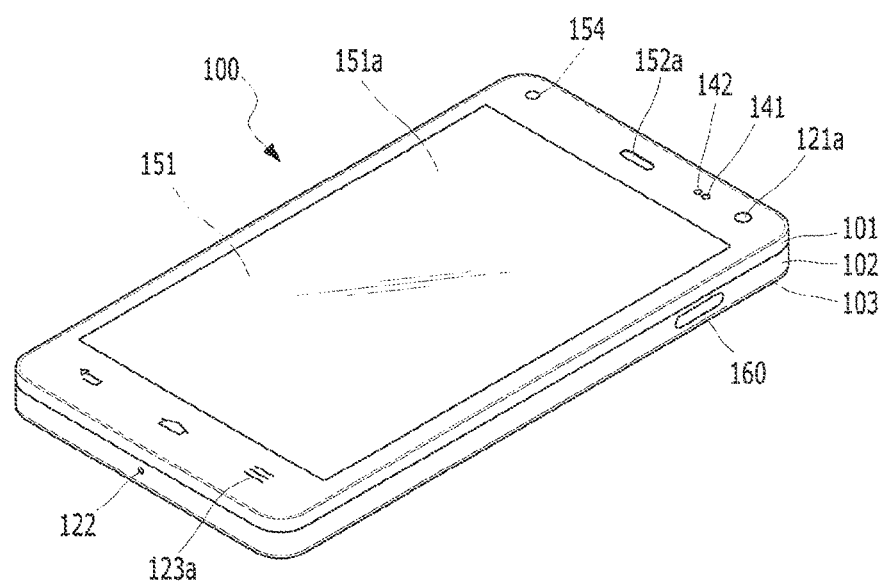
FIGS. 1*b* and 1*c* are conceptual diagrams for an example of a mobile terminal according to the present invention seen from a different view.
Figure 1C:
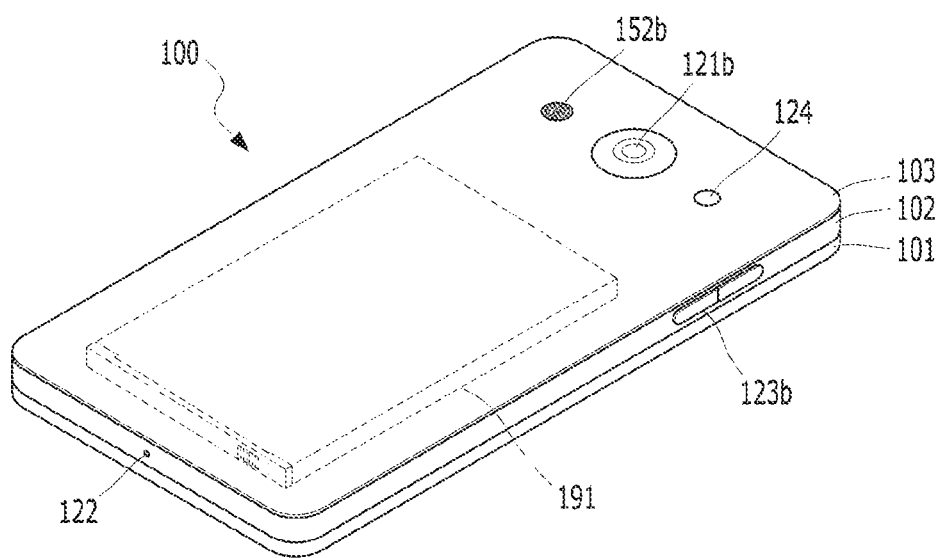

Referring to FIGS. 1*a* to 1*c*, FIG. 1*a* is a block diagram for explaining a mobile terminal according to the present invention and FIGS. 1*b* and 1*c* are conceptual diagrams for an example of a mobile terminal according to the present invention seen from a different view.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the components shown in FIG. 1*a* is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes at least one selected from the group consisting of a broadcast receiving module 111, a mobile communication module 112, a wireless Internet module 113, a short-range communication module 114, and a location information module 115.

The input unit 120 includes a camera 121 or an image input unit for inputting an image signal, a microphone 122 or an audio input unit for inputting an audio signal, and a user input unit 123 (for example, a touch key, a push key, and the like) for allowing a user to input information. Audio data or image data obtained by the input unit 120 is analyzed and can be processed by a control command of a user.

The sensing unit 140 is typically implemented using one or more sensors configured to sense at least one selected from the group consisting of internal information of the mobile terminal, the surrounding environment of the mobile terminal, user information, and the like. For example, the sensing unit 140 can include at least one selected from the group consisting of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal 100 can be configured to utilize information obtained from two or more sensors by combining the information.

The output unit 150 is typically configured to output various types of information, such as audio, video, tactile output, and the like. The output unit 150 can include at least one selected from the group consisting of a display unit 151, an audio output module 152, a haptic module 153, and an optical output module 154. The display unit 151 may have an inter-layered structure or an integrated structure with a touch sensor to form a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled with the mobile terminal 100. The interface unit 160 can include at least one selected from the group consisting of wired or wireless ports, external power supply ports, wired or wireless data ports, memory card ports, ports for connecting a device equipped with an identification module, audio input/output (I/O) ports, video I/O ports, and earphone ports. In some cases, the mobile terminal 100 may perform assorted control functions associated with a connected external device, in response to the external device being connected to the interface unit 160.

The memory 170 is typically implemented to store data to support various functions of the mobile terminal 100. For instance, the memory 170 can be configured to store application programs executed in the mobile terminal 100, data or instructions for operations of the mobile terminal 100, and the like. Some of these application programs may be downloaded from an external server via wireless communication. Other application programs may be installed in the mobile terminal 100 at time of manufacturing the mobile terminal 100 for a basic function (for example, receiving a call, placing a call, receiving a message, sending a message, and the like). It is common for application programs to be stored in the memory 170, installed in the mobile terminal 100, and executed by the controller 180 to perform an operation (or function) of the mobile terminal 100.

The controller 180 controls overall operation of the mobile terminal 100, in addition to the operations associated with the application programs. The controller 180 processes a signal, data, information and the like inputted or outputted via the aforementioned configuration elements or executes an application program stored in the memory 170 to provide or process information or functions appropriate for a user.

In order to execute the applications programs stored in the memory 170, the controller 180 can control at least a part of the configurations elements mentioned earlier in FIG. 1a. Moreover, in order to execute the application programs, the controller 180 can operate at least two or more configuration elements included in the mobile terminal 100 by combining the configuration elements.

The power supply unit 190 receives external power or internal power under the control of the controller 180 to supply power to each of the configuration elements included in the mobile terminal 100. The power supply unit 190 may include a battery, and the battery may be configured to be embedded in the terminal body, or configured to be detachable from the terminal body.

At least a part of the configuration elements can operate in a manner of cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

The present invention provides a method for a mobile terminal to receive contents from another mobile terminal based on wireless communication between the mobile terminals. For example, a mobile terminal can mirror the output of another mobile terminal and may be able to receive contents from another mobile terminal using a content list stored in another mobile terminal. In the following example, the mobile terminals interacting with each other are referred to as a first terminal and a second terminal, respectively. Moreover, assume that the first terminal and the second terminal correspond to a smartphone and a tablet PC, respectively, in the following drawing, by which the present invention may be non-limited.

Basically, it may assume that the first terminal and the second terminal include at least one or more configuration elements shown in FIGS. 1a to 1c. Specifically, the first and the second terminal can commonly include the wireless communication unit 110, the display unit 151, the memory 170, and the controller 180 among the configuration elements shown in FIGS. 1a to 1c, by which the present invention may be non-limited. If necessary, the first and the second terminal can further include a part of the configuration elements shown in FIGS. 1a to 1c.

In order to clearly indicate the configuration elements commonly included in the first and the second terminal, such a prefix as 'first' is attached to the configuration element of the first terminal and such a prefix as 'second' is attached to the configuration element of the first terminal. And, in order to easily distinguish overlapped terminologies from each other, such prefixes as 'first' and 'second' can be used.

Moreover, assume that a first display unit and a second display unit correspond to a touch screen capable of receiving a touch input. Hence, the first display unit and the second display unit can perform both an output device role for outputting information and an input device role for receiving a touch input.

In the following embodiment, examples of a touch input including a touch input, a long touch input (touching a point for more than prescribed time), a drag input, a flicking input, and the like are illustrated. In this case, the drag input may correspond to a state that a pointer touching a display unit moves in a prescribed direction and maintains the touch or a state that a pointer touching a display unit moves in a prescribed direction and releases the touch. In particular, when a first item is dragged to a second item, it may indicate a state that the first item is dragged on the second item or a state that the first item is dragged to the second item and then a pointer is released from the display unit.

In the following embodiment, although it is explained as a specific operation is performed in response to a specific touch input, a touch input for triggering the specific operation is not restricted by the explained touch input. For example, although a first operation is performed by a drag input, it is apparent that the first operation is capable of being performed by a different touch input. And, a touch input can be replaced with a gesture input, a push input for pushing a key, or the like.

In the following, a mobile terminal according to the present invention is explained in detail with reference to following drawings.

Figure 2:
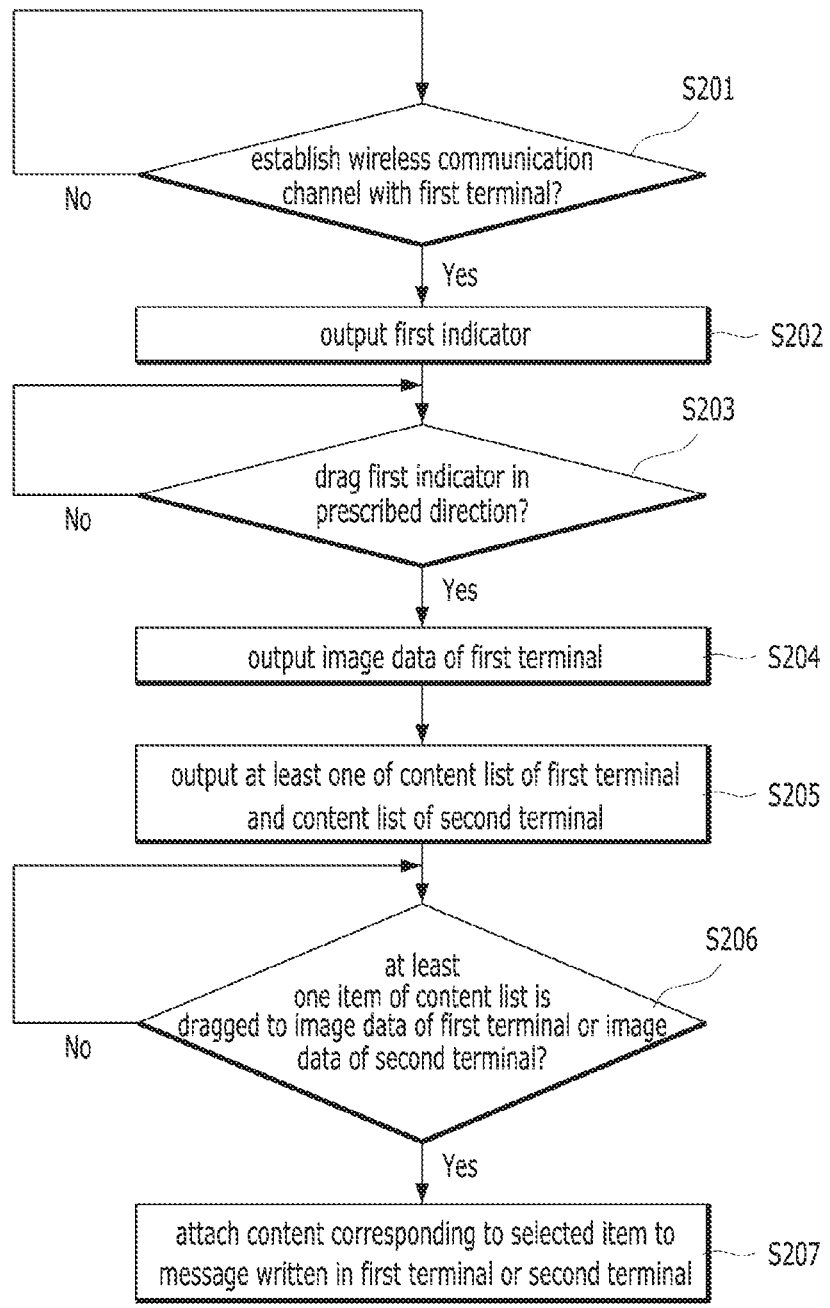
FIG. 2 is a flowchart for a method of sharing data between mobile terminals according to one embodiment of the present invention.

FIG. 2 is a flowchart for a method of sharing data between mobile terminals according to one embodiment of the present invention.

First of all, if a wireless communication channel is established between a first terminal and second terminal [S201], the second terminal can output a first indicator for outputting image data of the first terminal [S202]. In this case, it may use such a short-range mobile communication technology as Bluetooth, Wi-Fi Direct, and the like as a wireless communication scheme between the first terminal and the second terminal. Or, it may also use such a mobile communication technology as LTE, HSPDA, HSPA, and the like. A wireless communication scheme between the first terminal and the second terminal is not restricted by the aforementioned wireless communication schemes.

If a wireless channel is established between the first terminal and the second terminal, a second controller can output a first indicator for outputting image data of the first terminal via a second display unit. In this case, the first indicator may have a shape of an icon or an image object. If the first indicator has a shape of an image object, the image object can be located at the boundary of the second display unit.

Figure 3:
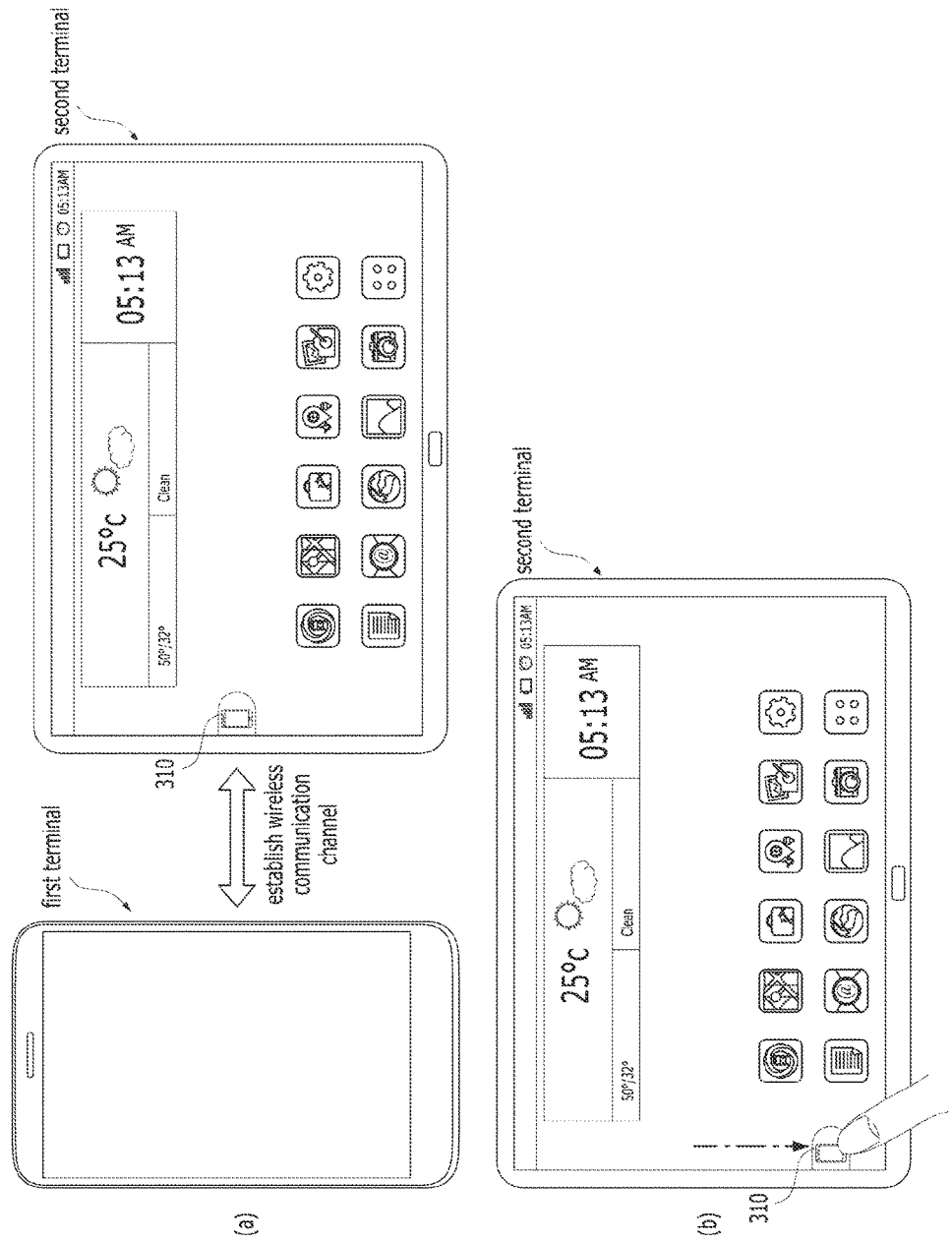
FIG. 3 is a diagram for an example of outputting a first indicator.

For example, FIG. 3 is a diagram for an example of outputting the first indicator. If a wireless communication channel is established between the first terminal and the second terminal, the second controller can control the first indicator 310 to be outputted via the second display unit. FIG. 3(a) illustrates an example that an image object including a semicircle shape at one end is outputted at the left boundary of the second display unit.

As shown in the example of FIG. 3(a), one end of the first indicator 310 may have a semicircle shape or a spiky shape. One end of the first indicator 310 can be used for guiding a drag moving direction of a pointer. For example, as shown in the example of FIG. 3(a), if one end of a semicircle shape of the first indicator 310 is placed towards the right direction, it is able to guide that a first area is to be outputted only when a pointer touching the first indicator 310 is dragged to the right.

Although it is not depicted, if a size of the first area is magnified more than a prescribed value, one end of the first indicator 310 can be placed towards a direction opposite to an initial direction. In this case, if the point touching the first indicator 310 is dragged to the left, the size of the first area can be gradually decreased.

Identification information for identifying the first terminal can be outputted on the top of the first indicator 310. For example, referring to FIG. 3(a), an image is outputted on the top of the first indicator 310 to indicate that the first terminal corresponds to a smartphone. If an image representing the first terminal is outputted on the top of the first indicator 310, it may be able to easily identify a type of a device connected with the second terminal. As shown in FIG. 3(a), the identification information may have an image form or a text form.

A position of the first indicator 310 can be controlled by a user input. For example, if a pointer touching the first indicator 310 is dragged along with the boundary of the second display unit, the second controller can control the position of the first indicator 310 to be changed according to the pointer. For example, if the pointer touching the first indicator 310 is dragged to up direction, as shown in FIG. 3(b), the second controller can control a position at which the first indicator 310 is displayed to be changed according to a moving path of the pointer.

As shown in FIG. 3(b), if the pointer touching the first indicator 310 is dragged along with the boundary of the second display unit, a position at which the first indicator 310 is displayed can be changed to a position to which the pointer is dragged.

According to the aforementioned example, if a wireless communication channel is established between the first terminal and the second terminal, the second terminal can output the first indicator 310. In this case, the second controller can control the first indicator 310 only when a prescribed application for sharing data with the first terminal is executed. For example, if a prescribed application is executed after a wireless communication channel is established between the first terminal and the second terminal, or if a wireless communication channel is established between the first terminal and the second terminal after a prescribed application is executed, the second controller can control the first indicator 310 to be outputted via the first display unit.

If the pointer touching the first indicator is dragged in a prescribed direction [S203], the second controller can control image data received from the first terminal to be outputted via a partial area of the first display unit [S204]. In this case, a size of the area on which the image data is outputted can be controlled according to a displacement of the pointer, which has been dragged in a prescribed direction.

Figure 4:
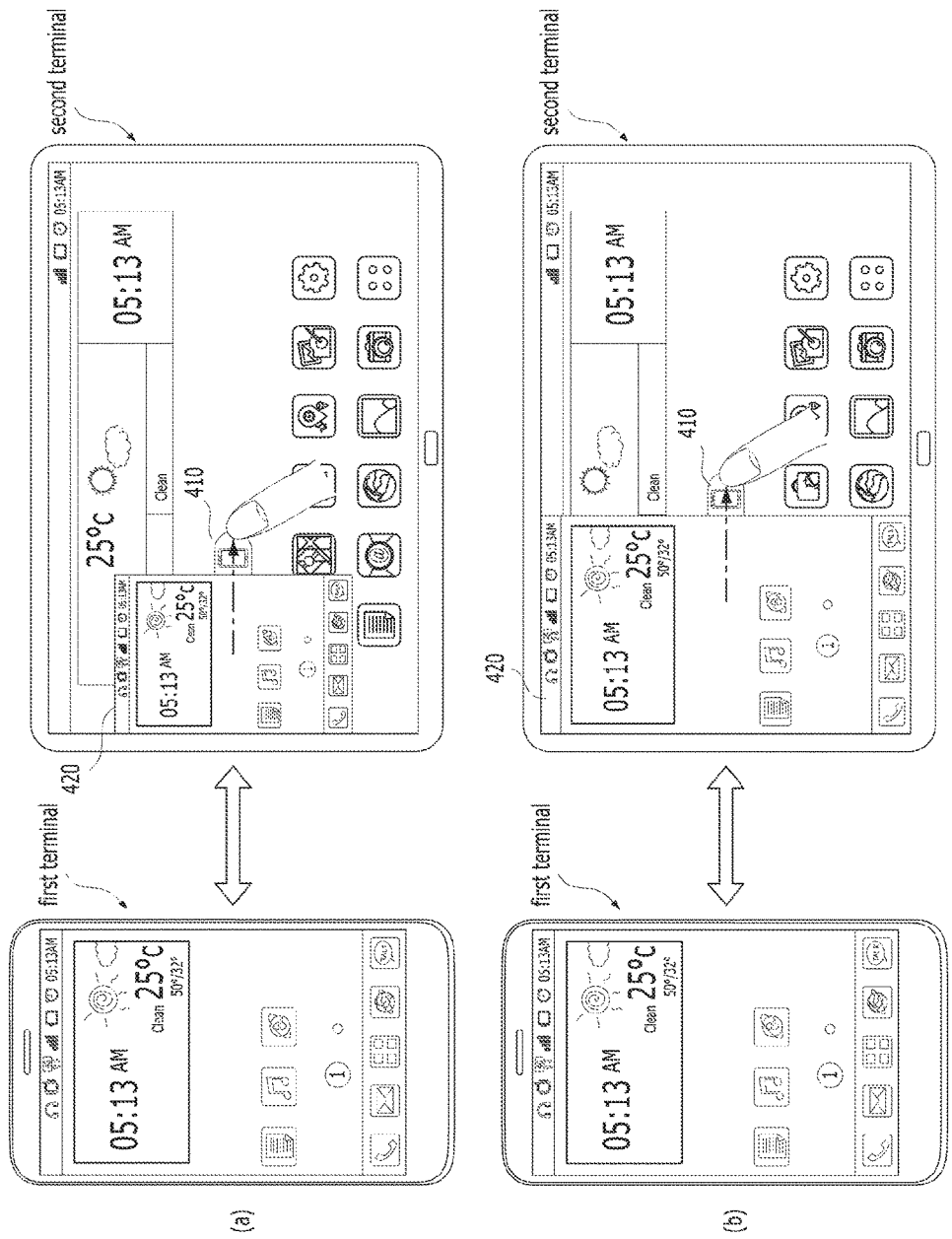
FIG. 4 is a diagram for an example of outputting an image data received from a first terminal.

For example, FIG. 4 is a diagram for an example of outputting an image data received from a first terminal. If a pointer touching a first indicator 410 is dragged in a prescribed direction, as shown in FIG. 4(a), the second controller can control image data received from the first terminal to be outputted. In this case, a size of a first area 420 on which the image data received from the first terminal is outputted can be controlled according to a displacement of the pointer, which has been dragged in a prescribed direction.

For example, as shown in FIG. 4(a), if the pointer is dragged to the left/right, a width of the first area 420 can be determined in accordance with a horizontal axis displacement of the pointer. In particular, if the horizontal axis displacement of the pointer increases, as shown in FIG. 4(b), the size of the first area 420 can gradually increase.

Although it is not depicted, if the pointer moves in up/down direction (e.g., if the first indicator is positioned at the top (or bottom) of the second display unit and the pointer touching the first indicator is dragged in down (or up) direction), a height of the first area can be determined in accordance with a vertical axis displacement of the pointer.

As a different example, if a displacement of the pointer is equal to or less than a predetermined value, the second controller outputs the first area with a predetermined size. If the displacement of the pointer becomes equal to or greater than the predetermined value, the second controller can control a horizontal length or a vertical length of the first area to be increased as much as a displacement increase amount of the pointer.

Image data received from the first terminal can be outputted via the first area. In this case, the image data received from the first terminal may correspond to a real time output image of the first terminal (i.e., image currently outputted by the first display unit) or an execution screen of a prescribed application installed in the first terminal. In this case, the prescribed application may correspond to an application lastly executed in the first terminal, an application most frequently executed in the first terminal, or an application stored by a user. Although the prescribed application is not outputted via the first display unit, the first terminal can transmit an image data, which is obtained by encoding an output screen of the prescribed application, to the second terminal.

As a further different example, the second controller can determine a type of image data to be outputted via the first area based on a type of a touch input touching the first indicator. For example, if a user input touching the first indicator is received, an execution screen of a prescribed application installed in the first terminal is outputted via the first area. If a pointer touching the first indicator is dragged or a pinch out input inputted by two pointers touching the first indicator is received, the second controller can control a real time output image of the first terminal to be outputted. In particular, if a touch input of a first type is received on the first indicator, the second controller can control an execution screen of a prescribed application installed in the first terminal to be outputted via the first area. If a touch input of a second type is received on the first indicator, the second controller can control a real time output screen of the first terminal to be outputted via the first area.

If the first area is magnified more than a prescribed size, the second controller can output image data for a plurality of pages.

Figure 5:
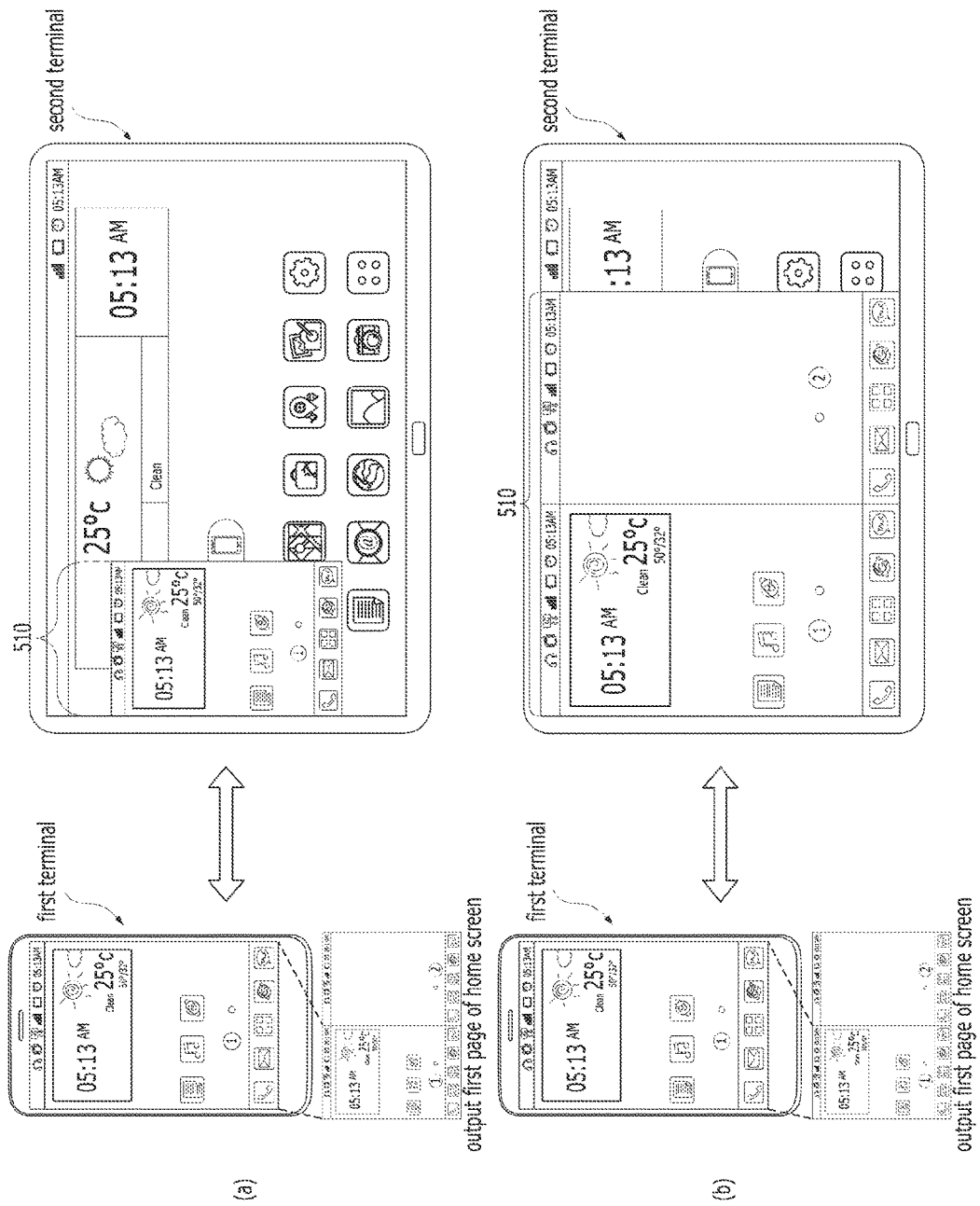
FIGS. 5 to 7 are diagrams for an example of outputting a plurality of pages capable of being outputted in a first terminal through a first area.
Figure 6:
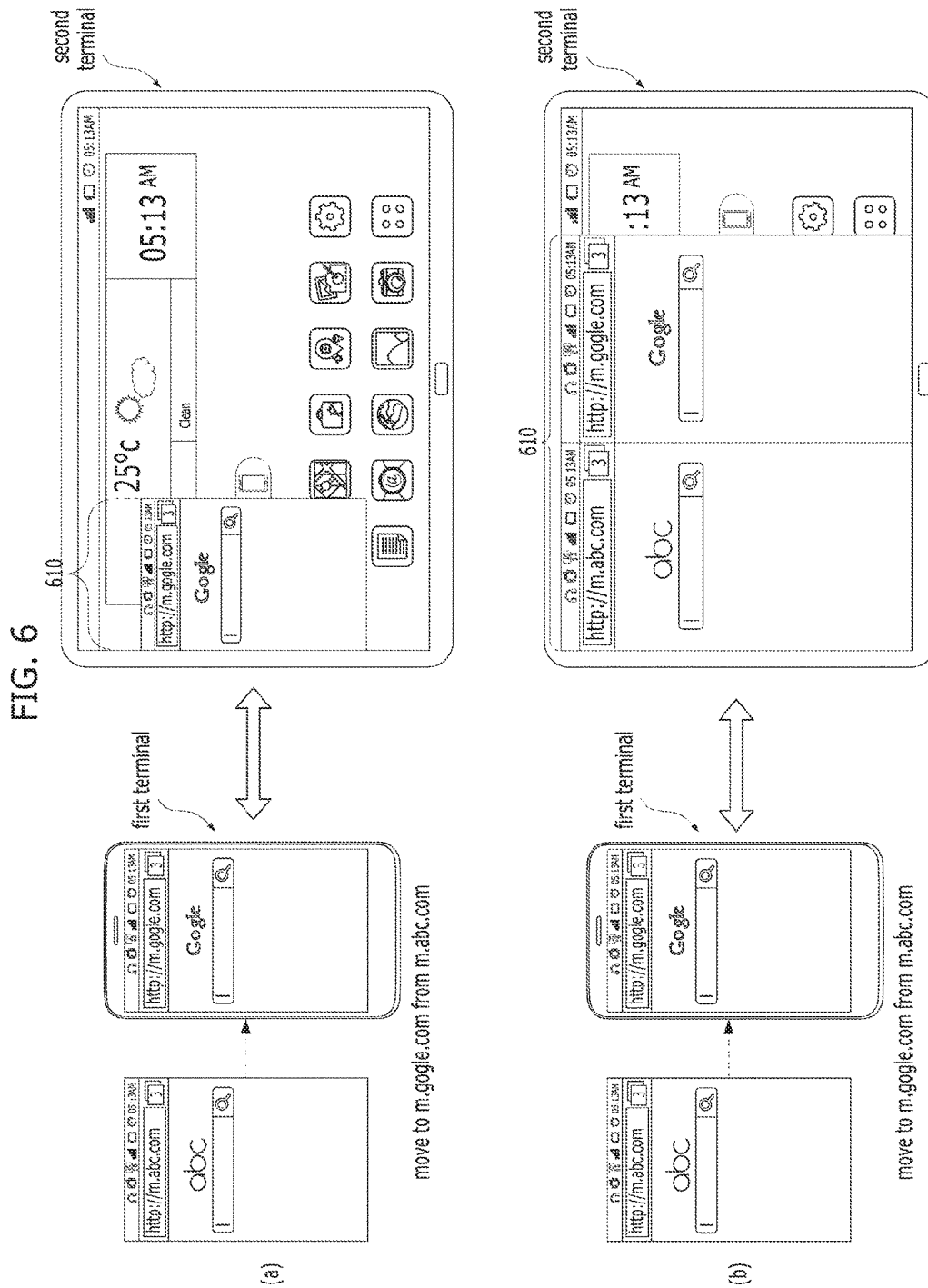
Figure 7:
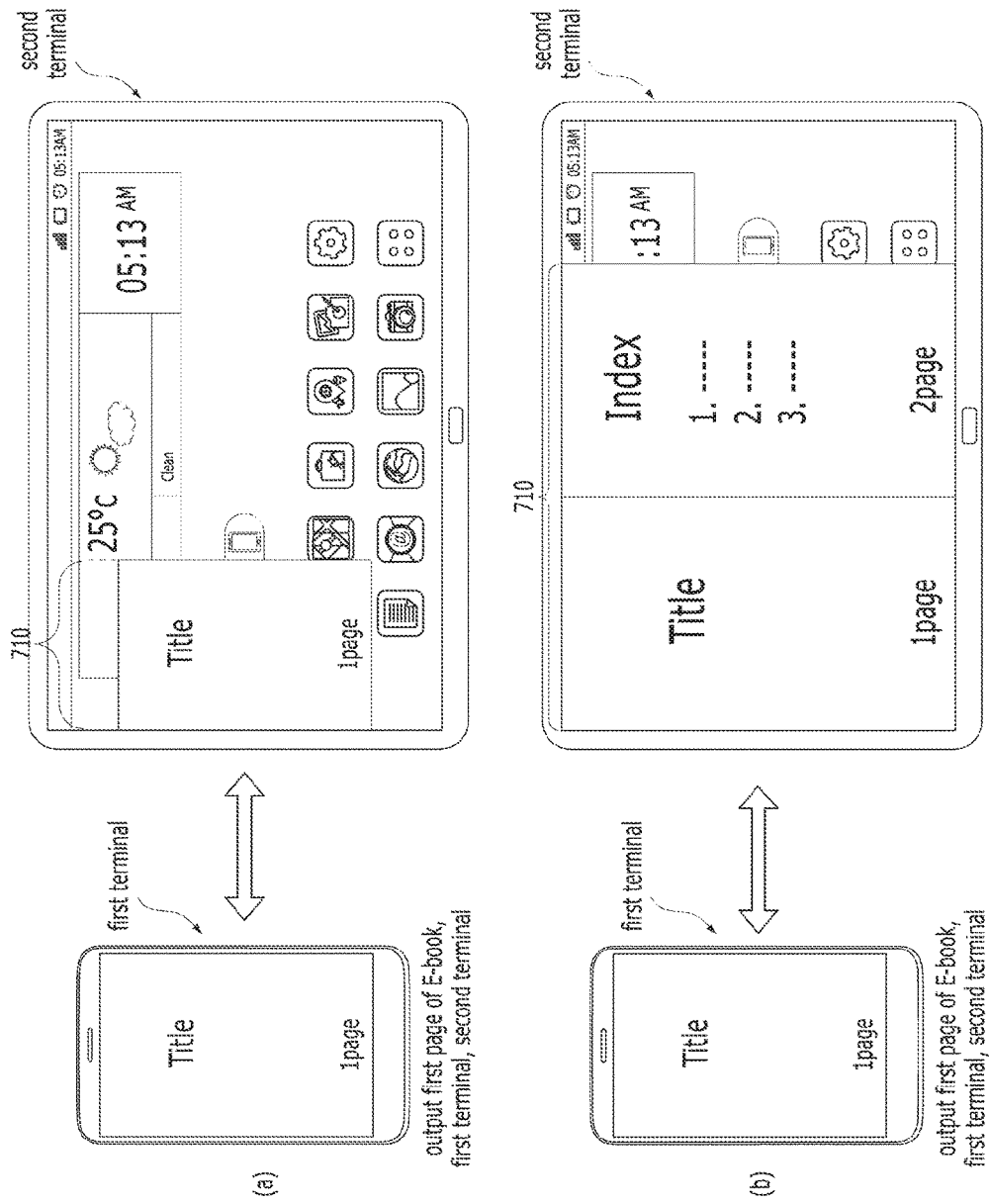

For example, FIGS. 5 to 7 are diagrams for an example of outputting a plurality of pages capable of being outputted in a first terminal through a first area.

If a displacement of the pointer touching the first indicator increases in a prescribed direction, the second controller can control a size of the first area outputting image data of the first terminal to be increased. In this case, if the size of the first area increases more than a prescribed size, the second controller can control a plurality of pages capable of being outputted in the first terminal to be outputted via the first area.

For example, FIG. 5 is a diagram for an example of outputting a plurality of pages of a home screen. When the home screen consists of a plurality of pages, the second controller can receive and output image data for a page currently outputted via the first display unit. If a size of the first area 510 becomes equal to or greater than a prescribed size, the second controller can further receive image data for a next page or a previous page of the page currently outputted via the first display unit as well as the page currently outputted via the first display unit. Hence, a plurality of pages of the home screen can be outputted at the same time via the first area 510.

Referring to FIGS. 5(a) and (b), if the size of the first area 510 increases while a first page of the home screen is outputted, the first page and the second page of the home screen can be outputted at the same time.

FIG. 6 is a diagram for an example of outputting a plurality of web pages. If a web browser is executed in the first terminal, the second terminal can receive and output image data for the web page currently outputted via the first display unit. If a size of the first area 610 becomes equal to or greater than a prescribed size, the second controller can further receive image data for a web page previously visited by the first terminal or a web page bookmarked by the first terminal as well as the page currently outputted via the first display unit. Hence, a plurality of web pages can be outputted at the same time via the first area 610.

Referring to FIGS. 6(a) and (b), if the size of the first area 610 increases while a specific web page is outputted, two web pages can be outputted at the same time.

FIG. 7 is a diagram for an example of outputting a plurality of E-book pages. If an E-book application is executed in the first terminal, the second terminal can receive and output image data for a specific page currently outputted via the first display unit. If a size of the first area 710 becomes equal to or greater than a prescribed size, the second controller can further receive image data for a next page or a previous page of the specific page as well as the specific page currently outputted via the first display unit. Hence, a plurality of E-book pages can be outputted at the same time via the first area 710.

Referring to FIGS. 7(a) and (b), if the size of the first area 710 increases while a first page of E-book contents is outputted, the first page and the second page of the E-book contents can be outputted at the same time.

FIGS. 5 to 7 illustrate examples that a plurality of pages of a home screen, a plurality of web pages, and a plurality of pages of E-book contents are outputted according to the increase of the size of the first area. Moreover, a plurality of pictures, a plurality of pages for writing a document, and the like can be outputted according to the increase of the size of the first area. In particular, the present embodiment can be applied to various contents.

If a prescribed list, which is capable of being checked by scrolling the list to the top/bottom or left/right, is outputted via the first terminal, the second terminal can control more items of the list to be outputted according to the increase of the size of the first area.

Figure 8:
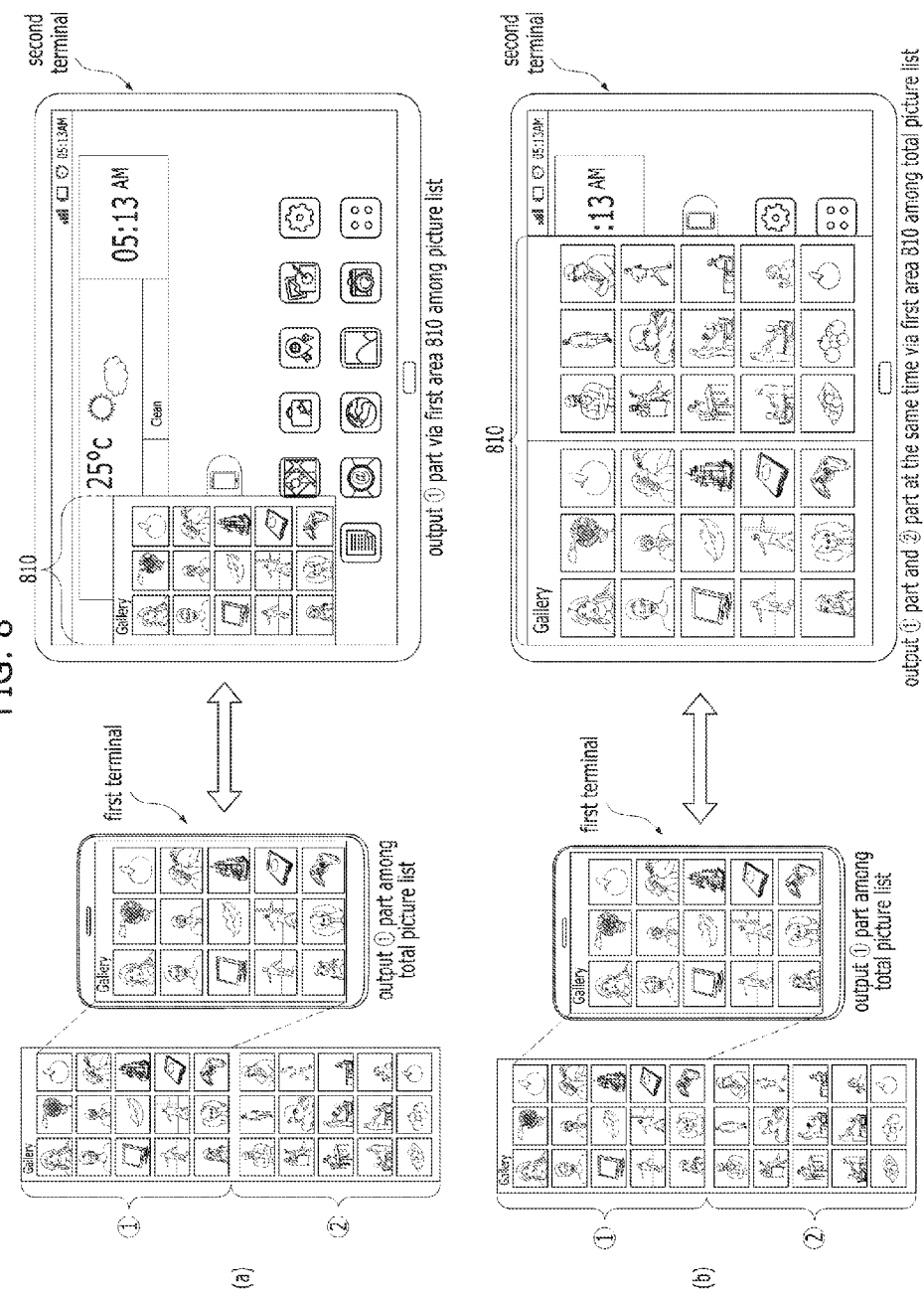
FIG. 8 is a diagram for an example of outputting more items of a prescribed list according to the increase of a size of a first area.

For example, FIG. 8 is a diagram for an example of outputting more items of a prescribed list according to the increase of a size of a first area. For clarity, assume a state that a picture list is outputted via the first terminal.

If it is unable to output all pictures on a single screen due to the too many captured pictures, the second controller displays a part of the pictures only. The second controller can control not displayed pictures to be outputted in response to a user input that scrolls the picture list to the top/bottom (or left/right).

In this case, if the size of the first area is equal to or less than a prescribed size, the second controller can receive and output image data for a picture list including only a part of total pictures currently outputted via the first display unit. If the size of the first area becomes equal to or greater than the prescribed size, the second controller can further receive a picture list including another part of the total pictures and may be able to output the list. Hence, as shown in the example of FIGS. 8(a) and (b), it may be able to display more pictures via the second display unit.

In this case, a partial item (i.e., a part of pictures) can be overlapped with each other in the two picture list pages outputted via the second display unit.

Unlike the examples mentioned earlier in FIGS. 5 to 8, if a displacement of the pointer touching the first indicator is decreased in a prescribed direction, the second controller can control the size of the first area to be decreased.

FIGS. 4 to 8 show examples that an output of the first area for outputting image data received from the first terminal starts in response to a user input that drags the first indicator. Unlike the examples, the second controller can control the output of the first area to be started by a touch input touching (long touching) the first indicator or a pinch out input inputted by two pointers touching the first indicator (i.e., a user input that a distance between two pointers is gradually increasing).

In the foregoing description, it is explained as a size of the first area increases according to the increase of a displacement of a pointer touching the first indicator in a prescribed direction. Yet, the size of the first area can also be increased by a pinch out input inputted by two points on the first area, a drag input of a pointer touching the boundary of the first area, or the like.

Image data of the second terminal can be outputted via a remaining area (hereinafter, a second area) of the second display unit from which the first area is excluded. In particular, image data of the first terminal is outputted via the first area and image data of the second terminal can be outputted via the second area.

In this case, the first area can be outputted in a manner of overlaying the second area, or the first area and the second area may form a separate area which is not overlapped with each other.

For example, FIG. 9 is a diagram for explaining arrangement of a first area and a second area. As shown in an example of FIG. 9(a), the first area 910 can be displayed on the second area 920 in a manner of overlaying the second area. In this case, image data outputted via the second area 920 can be blocked by the first area 910. In order to minimize the blocking for the image data outputted via the second area 920, the first area 910 displayed on the second area 920 can be configured by a translucent state.

As shown in an example of FIG. 9(b), the first area 910 and the second area 920 can be respectively positioned at a not-overlapped separate space. In this case, the image data outputted via the second area 920 is not blocked by the first area 910. Yet, as a size of the first area 910 is getting bigger, a size of the second area 920 decreases. Hence, a size of the image data outputted via the second area 920 can be gradually decreased.

The second controller can control a form of arrangement of the first area 910 and the second area 920 according to a size of the first area 910. For example, if the size of the first area 910 is less than a prescribed value, as shown in the example of FIG. 9(a), the first area 910 can be outputted on the second area 920 in a manner of overlaying the second area. If the size of the first area 910 becomes equal to or greater than the prescribed value, as shown in the example of FIG. 9(b), the second controller can control the first area 910 and the second area 920 to be arranged at a not-overlapped separate space.

As a different example, the second controller can control a form of arrangement of the first area and the second area according to orientation (horizontal/vertical) of the second terminal.

For example, FIG. 10 is a diagram for an example of differently arranging a first area and a second area according to an orientation of a second terminal. If the second terminal is placed in portrait orientation, as shown in an example of FIG. 10(a), the second controller can control the first area 1010 to be displayed on the second area 1020 in a manner of overlaying the second area. As a result, among image data outputted via the second area 1020, image data overlapped with the first area 1010 can be blocked by the first area 1010.

On the contrary, if the second terminal is placed in landscape orientation, as shown in an example of FIG. 10(b), the second controller can control the first area 1010 and the second area 1020 to be arranged at a not-overlapped separate space. As a result, the image data outputted via the second area 1020 is not blocked anymore by the first area 1010.

The second controller can determine the orientation of the second terminal based on a signal sensed by a second sensing unit.

As a case opposite to the example of FIG. 10, when the second terminal is placed in landscape orientation, the first area can be displayed on the second area in a manner of overlaying the second area. When the second terminal is placed in portrait orientation, the first area and the second area can be arranged at a not-overlapped separate space.

If the second terminal rotates to make the second terminal to be placed in landscape orientation from portrait orientation or rotates to make the second terminal to be placed in portrait orientation from landscape orientation, the second controller can control a size of the first area to be changed to a predetermined size.

Figure 11:
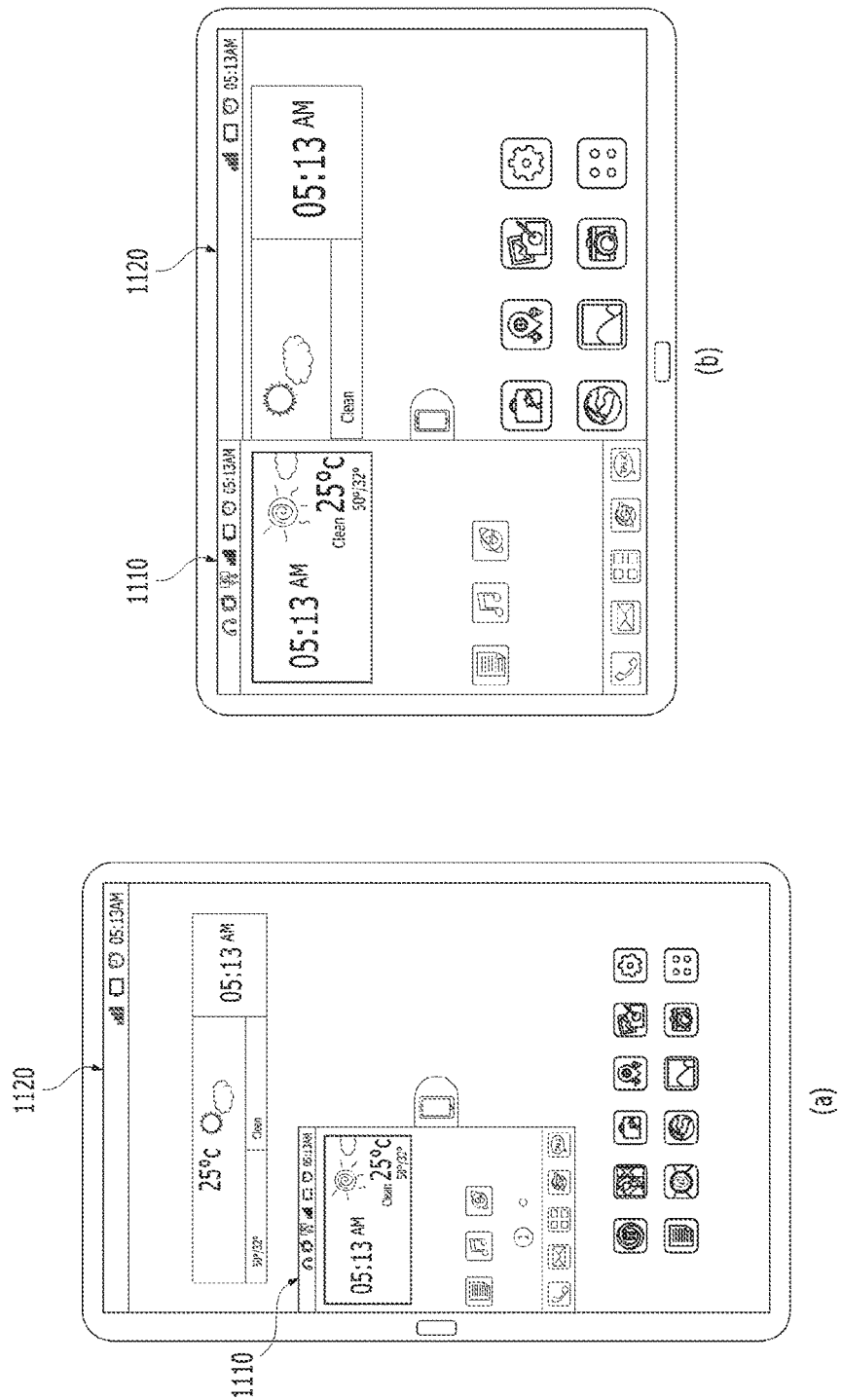
FIG. 11 is a diagram for an example of controlling a size of a first area according to a change of an orientation of a second terminal.

For example, FIG. 11 is a diagram for an example of controlling a size of a first area according to a change of an orientation of a second terminal. If the second terminal is placed in portrait orientation, as shown in an example of FIG. 11(a), the second controller can determine a size of the first area 1110 based on a displacement of a pointer that drags a first indicator. If the second terminal rotates to make the second terminal to be placed in landscape orientation, the second controller can control the size of the first area 1110 to be changed to a predetermined size. For example, referring to FIG. 11(b), if the second terminal rotates to make the second terminal to be placed in landscape orientation, the size of the first area 1110 is changed to a size capable of occupying the half of the second display unit.

As a case opposite to the example of FIG. 11, if the second terminal is placed in landscape orientation, the second controller can determine the size of the first area based on a displacement of a pointer that drags a first indicator. If the second terminal rotates to make the second terminal to be placed in portrait orientation, the second controller can control the size of the first area to be changed to a predetermined size.

The second controller can control a type of image data to be outputted via the first area to be controlled according to orientation of the second terminal. For example, if the second terminal is placed in portrait orientation (or, landscape orientation), the second controller can control an execution screen of a prescribed application installed in the first terminal to be outputted via the first area. Meanwhile, if the second terminal rotates to make the second terminal to be placed in landscape orientation (or, portrait orientation), the second controller can control a real time output screen of the first terminal to be outputted via the first area.

When the first area is displayed on the second area in a manner of overlaying the second area, if a size of the first area increases, a blocked size of image data outputted via the second area also increases. Hence, it is unable to properly watch the image data outputted via the second area. Although the first area and the second area are arranged at a not-overlapped separate space, as the size of the first area is getting bigger, the size of the second area decreases. As a result, it is difficult to watch the image data outputted via the second area. Hence, if the size of the first area becomes equal to or greater than a prescribed size, the second controller can control a second indicator to be outputted to stop displaying the first area.

Figure 12:
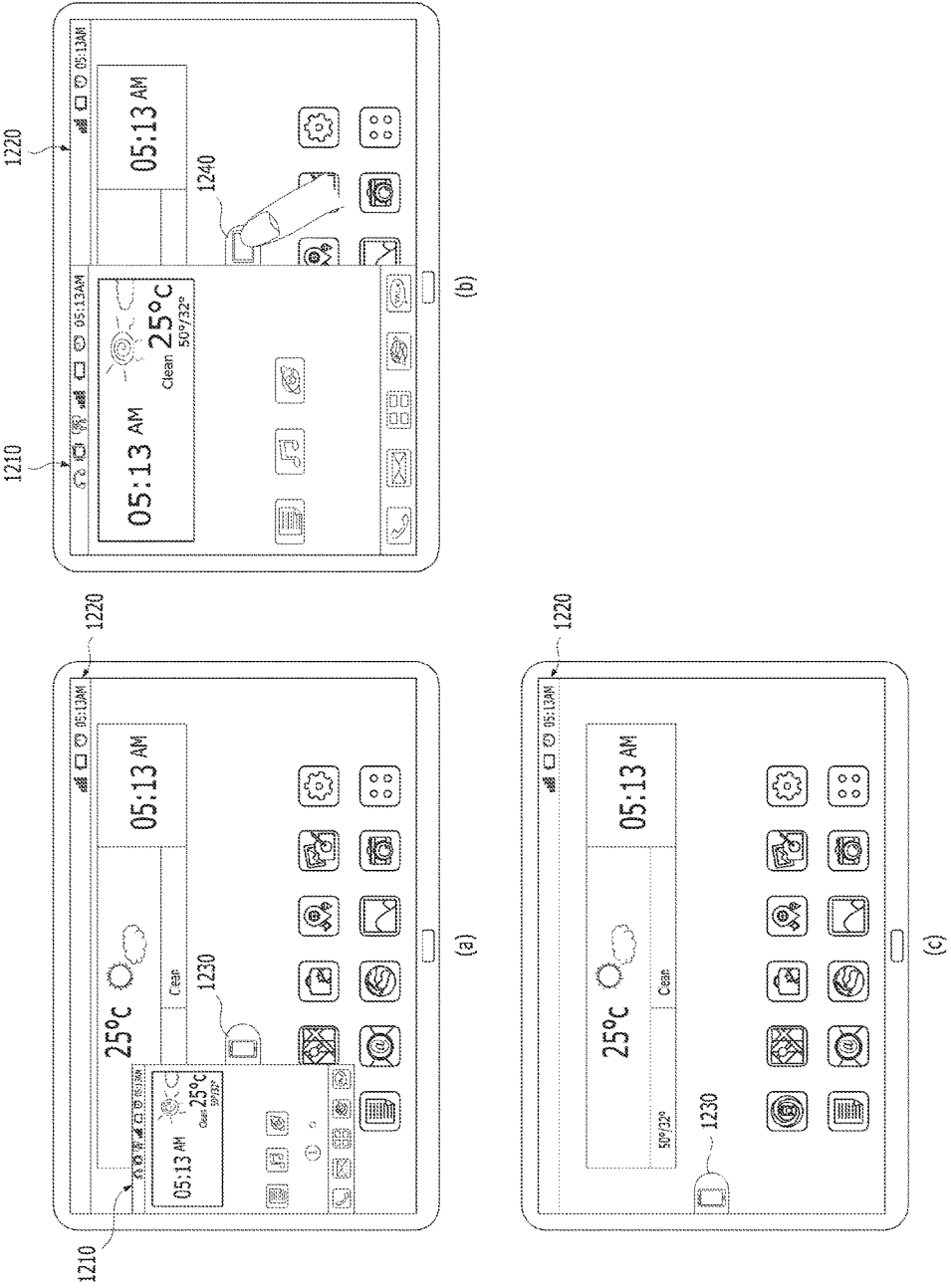
FIG. 12 is a diagram for an example of outputting a second indicator.

For example, FIG. 12 is a diagram for an example of outputting a second indicator. If a displacement of a pointer touching a first indicator 1230 increases in a prescribed direction, the second controller can control a size of a first area 1210 to be increased. In this case, if the size of the first area 1210 becomes equal to or greater than a prescribed value, the second controller can control a second indicator 1240 to be outputted to stop displaying the first area 1210. In this case, the second indicator 1240 may have a shape of an icon or a shape of an image object. For example, referring to FIGS. 12(a) and (b), as the size of the first area 1210 is getting bigger, the first indicator 1230 is not displayed and the second indicator 1240 is outputted.

In this case, an image representing the second terminal can be outputted on the second indicator 1240. For example, FIG. 12(b) shows an example of outputting an image indicating that the second terminal corresponds to a tablet on the second indicator 1240. If the image representing the second terminal is outputted on the second indicator 1240, a user can easily distinguish the first indicator 1230 from the second indicator 1240. As shown in FIG. 12(b), identification information may have an image form or a text form.

As shown in the example of FIG. 12(b), the second controller can control the second indicator 1240 to be outputted instead of the first indicator 1230 or control the first indicator 1230 and the second indicator 1240 to be outputted together.

If a user touches the second indicator 1240, the second controller can control the first area 1210 not to be displayed. As shown in the example of FIG. 12(c), image data outputted via the second area 1220 can be outputted on the second display unit in a full screen. If the display of the first area 1210 is stopped, the first indicator 1230 can be outputted again. The first indicator 1230 can be outputted instead of the second indicator 1240 or can be outputted together with the second indicator 1240.

FIG. 12 illustrates an example that the second indicator is outputted only when the size of the first area is equal to or greater than a prescribed size. Unlikely, when wireless communication is established between the first terminal and the second terminal, if displaying of the first area starts by dragging the first indicator, the second controller can control the second indicator to be outputted.

The second controller can generate a control signal for remotely controlling the first terminal based on a touch input inputted on the first area and generate a control signal for controlling the second terminal based on a touch input inputted on the second area. For example, if a user touches an application icon on the first area, an application corresponding to the touched icon can be executed in the first terminal. If a user touches an application icon on the second area, an application corresponding to the touched icon can be executed in the second terminal. For example, if an icon of a message writing application is touched via the first area, the second controller may ask the first terminal to execute an application corresponding to the touched icon. Hence, a message writing screen can be outputted via the first area. Similarly, if an icon of a message writing application is touched via the second area, the second controller may be able to execute an application corresponding to the touched icon. Hence, a message writing screen can be outputted via the second area.

In addition, the second controller asks the first terminal to transmit a content list stored in the first terminal and may be able to output the received content list. Moreover, the second controller may be able to output a content list stored in the second terminal. In this case, contents can include all types of data capable of being handled by a terminal including an image, a video, a document, a memo, music, and the like.

Figure 13:
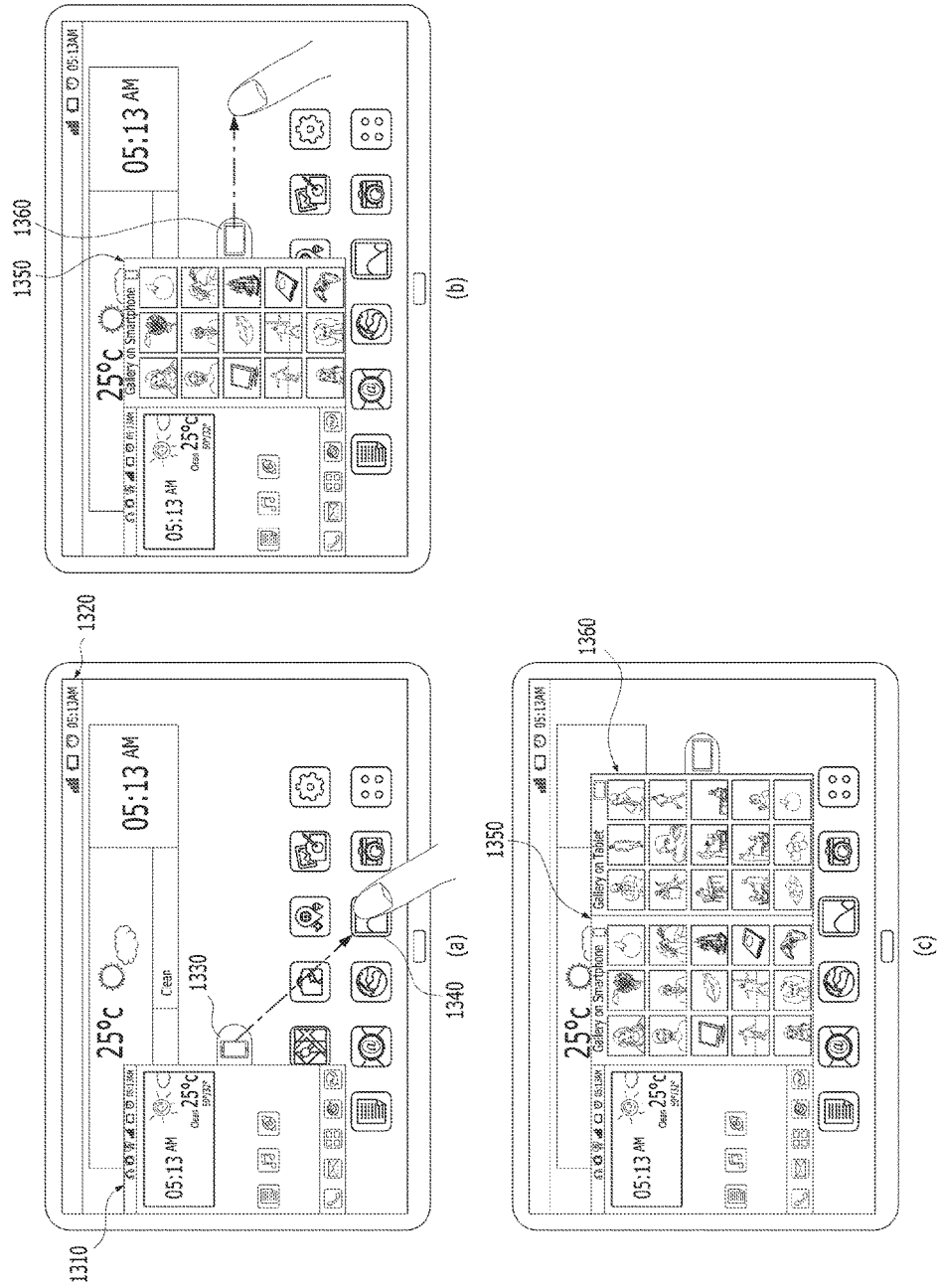
FIG. 13 is a diagram for an example of outputting a content list.

For example, FIG. 13 is a diagram for an example of outputting a content list. If a first indicator 1330 is dragged to a gallery icon 1340 which is outputted via a first area 1310 or a second area 1320, the second controller can ask the first terminal to provide an image list. Having received the image list from the first terminal, the second controller can output the received image list 1350. For example, referring to FIGS. 13(a) and (b), if the first indicator 1330 is dragged to the gallery icon 1340 on the second area 1320, the image list 1350 of the first terminal can be outputted.

Hence, a real time output screen of the first terminal and the image list 1350 of the first terminal can be outputted on the second display unit at the same time.

The second controller can determine a type of content to be outputted according to an icon to which the first indicator 1330 is dragged. For example, as shown in the example of FIG. 13(a), if the first indicator 1330 is dragged to an icon of a gallery application handling images, the second controller controls the image list 1350 to be outputted. On the contrary, if the first indicator 1330 is dragged to an icon of a voice recording application for voice recording, the second controller controls a voice recording file list to be outputted. If first indicator 1330 is dragged to an icon of a document writing application for handling documents, the second controller can control a document list to be outputted.

If the image list 1350 of the first terminal is outputted, the second controller can control a second indicator 1360 to be outputted. The second indicator 1360 can be outputted instead of the first indicator 1330 or can be outputted together with the first indicator 1330. If a prescribed touch input (e.g., a user input for touching the second indicator 1360 or dragging the second indicator 1360 in a prescribed direction) is inputted on the second indicator 1360 while the image list 1350 of the first terminal is outputted, as shown in the example of FIG. 13(c), the second controller can control an image list 1360 of the second terminal to be additionally outputted.

When a message writing screen is outputted via the second area, if a file attach icon for selecting an attachment file to be attached to a message is dragged to the first indicator, the second controller can control a content list of the first terminal to be outputted.

Figure 14:
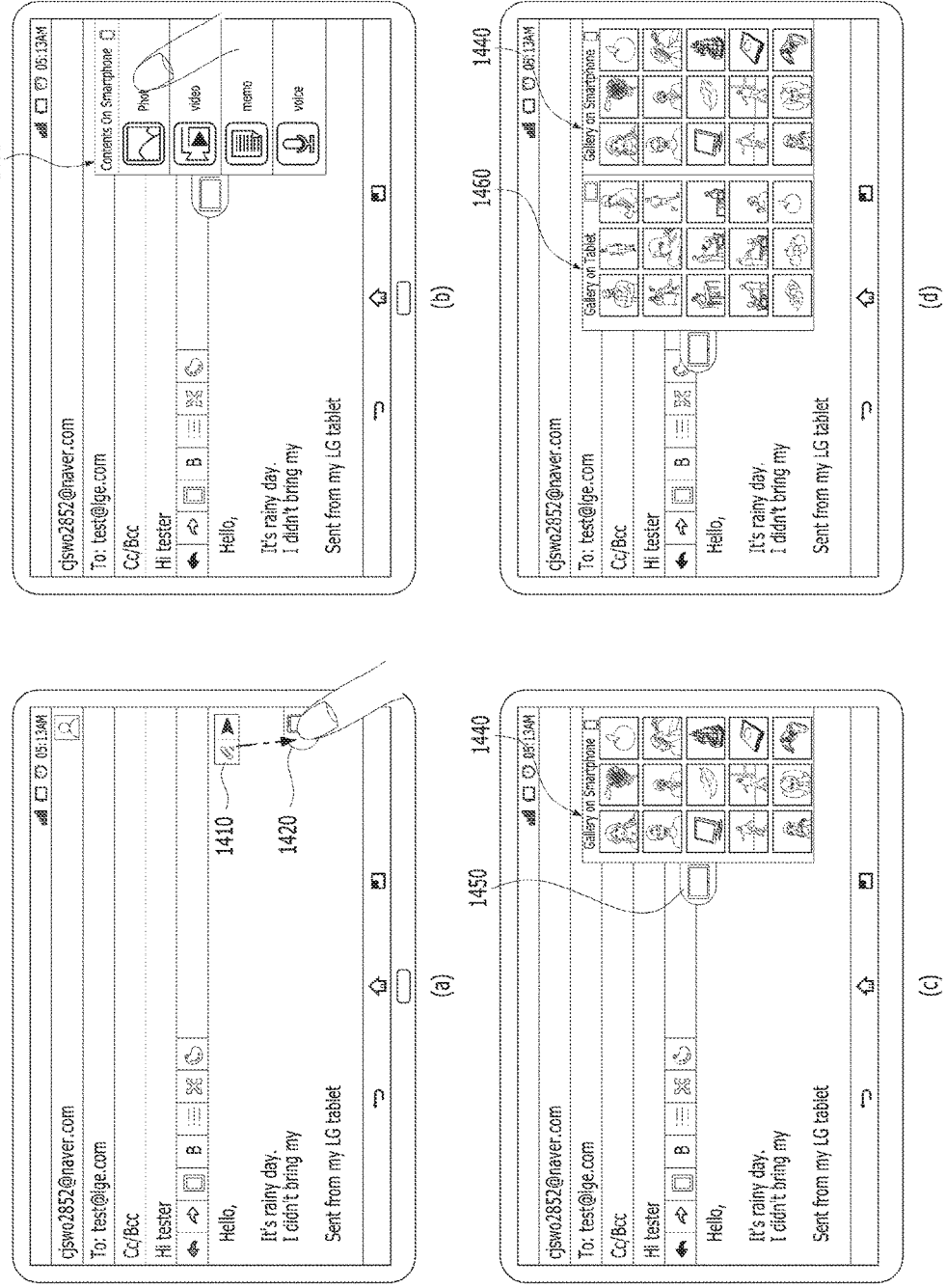
FIG. 14 is a diagram for a different example of outputting a content list.

For example, FIG. 14 is a diagram for a different example of outputting a content list. As shown in the example of FIG. 14(a), when a message writing screen is outputted via the second area, if a file attach icon 1410 for selecting an attachment file to be attached to a message is dragged to the first indicator 1420, the second controller can output a content list of the first terminal. In this case, the second controller can also output a menu 1430 for selecting a content type to be requested to the first terminal. Referring to the example shown in FIG. 14(b), the menu 1430 capable of selecting a content type from among a picture, a video, a memo, and voice is outputted. If a type of the menu 1430 is touched, the second controller asks the first terminal to transmit a content list of the selected type and can output the received content list. For example, referring to FIG. 14(b), if a picture item is selected from the menu 1430, as shown in the example of FIG. 14(c), the second controller can control a picture list 1440 of the first terminal to be outputted.

If the picture list 1440 of the first terminal is outputted, the second controller can control a second indicator 1450 to be outputted. The second indicator 1450 can be outputted instead of the first indicator 1420 or can be outputted together with the first indicator 1420. If a prescribed touch input (e.g., a user input for touching the second indicator 1450 or dragging the second indicator 1450 in a prescribed direction) is inputted on the second indicator 1450 while the picture list 1440 of the first terminal is outputted, as shown in the example of FIG. 14(d), the second controller can control a picture list 1460 of the second terminal to be additionally outputted.

Referring to FIGS. 13 and 14, if an additional user input is received after a content list of the first terminal is outputted, a content list of the second terminal is additionally outputted. Meanwhile, the second controller can control the content list of the first terminal and the content list of the second terminal to be outputted at the same time.

As a different example, if an application icon outputted via the first area is dragged to an application icon outputted via the second area or an application icon outputted via the second area is dragged to an application icon outputted via the first area, the second controller control the content list of the first terminal and the content list of the second terminal to be outputted at the same time.

Figure 15:
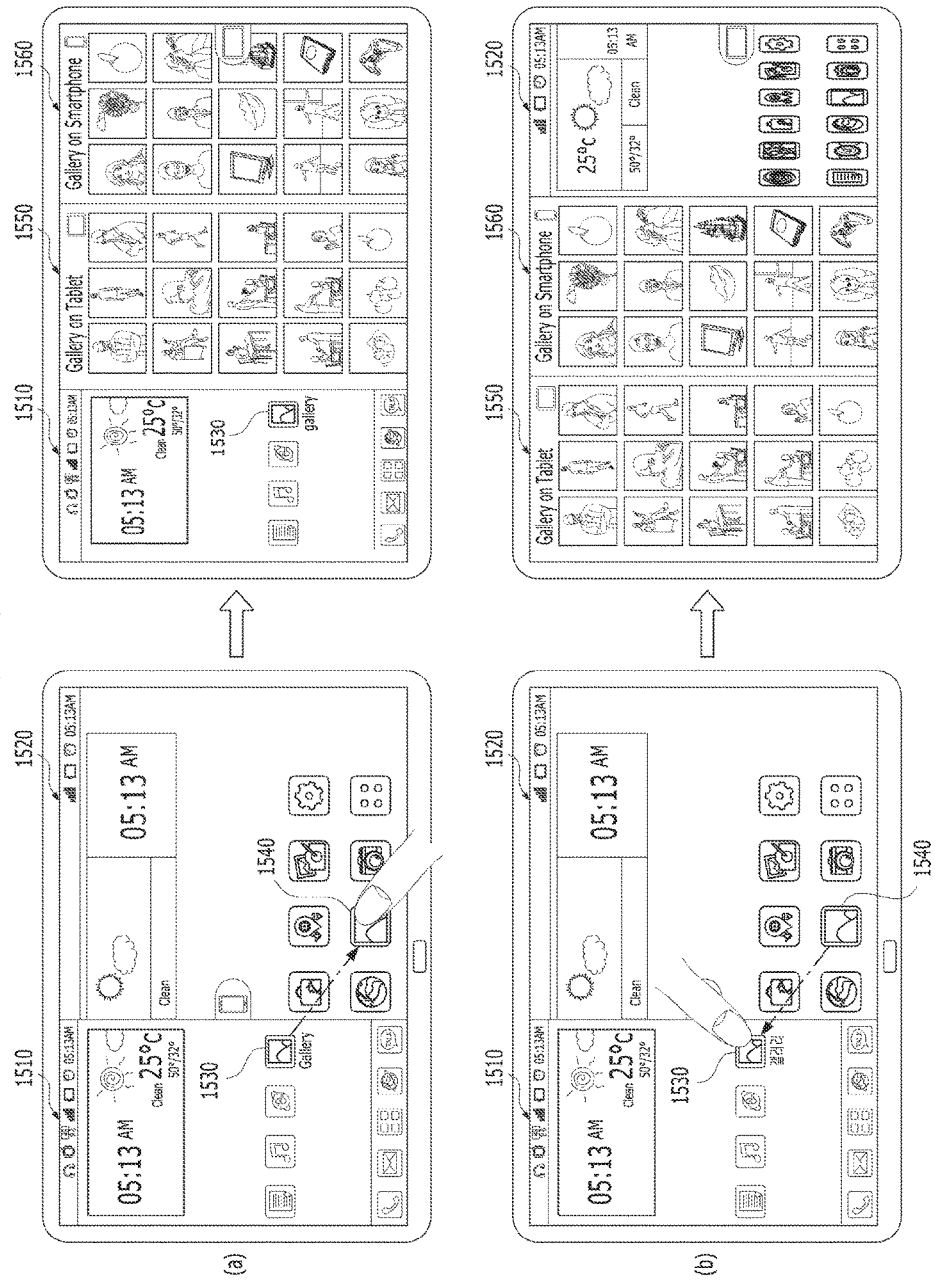
FIG. 15 is a diagram for an example of outputting a content list of a first terminal and a content list of a second terminal at the same time.

For example, FIG. 15 is a diagram for an example of outputting a content list of a first terminal and a content list of a second terminal at the same time. As shown in the example of FIG. 15(a), if a gallery icon 1530 outputted via a first area 1510 is dragged to a gallery icon 1540 outputted via a second area 1520, the second controller can control an image list of the first terminal and an image list of the second terminal to be outputted. As shown in the example of FIG. 15(b), if the gallery icon 1530 outputted via the second area 1520 is dragged to the gallery icon 1530 outputted via the first area 1510, the second controller can control the image list 1550 of the first terminal and the image list 1560 of the second terminal to be outputted.

Although FIGS. 15(a) and (b) explain an example of the image list, as mentioned earlier in FIG. 13, a content type can be controlled according to a type of a selected icon. For example, if a voice recording icon on the first area 1510 is dragged to a gallery application on the second area 1520, the second terminal can output the image list of the first terminal and a voice recording list of the second terminal at the same time.

In this case, the second controller can control either image data outputted by the first terminal or image data outputted by the second terminal to be terminated according to whether the gallery icon 1530 displayed via the first area 1510 is dragged to the second area 1520 or the gallery icon 1540 displayed via the second area 1520 is dragged to the first area 1510.

For example, if the gallery icon 1530 outputted via the first area 1510 is dragged to the gallery icon 1540 outputted via the second area 1520, as shown in the example of FIG. 15(a), the second controller continuously outputs the image data of the first terminal, stops outputting the image data of the second terminal, and can control the image list 1550 of the first terminal and the image list 1560 of the second terminal to be outputted.

On the contrary, if the gallery icon 1540 outputted via the second area 1520 is dragged to the gallery icon 1530 outputted via the first area 1510, as shown in the example of FIG. 15(b), the second controller stops outputting the image data of the first terminal, continuously outputting the image data of the second terminal, and can control the image list 1550 of the first terminal and the image list 1560 of the second terminal to be outputted.

Although a drag input is inputted in a direction opposite to the direction shown in FIGS. 15(a) and (b), the same embodiment can be applied. For example, if the gallery icon 1540 outputted via the second area 1520 is dragged to the gallery icon 1530 outputted via the first area 1510, the image data of the first terminal is continuously outputted and outputting the image data of the second terminal can be terminated.

In FIG. 15, a drag input is illustrated as a user input for outputting the content list of the first terminal and the content list of the second terminal at the same time. It is apparent that the content list of the first terminal and the content list of the second terminal are outputted at the same time by a touch input different from the input shown in FIG. 15. For example, if a touch input touching the gallery icon outputted via the second area is inputted in a state that the gallery icon outputted via the first area is touched, the second terminal can control the image list of the first terminal and the image list of the second terminal to be outputted at the same time.

The content list of the first terminal and the content list of the second terminal can include identification information for identifying the first terminal and identification information for identifying the second terminal, respectively. In this case, the identification information can include a text or an image for representing the first terminal or the second terminal.

Figure 16:
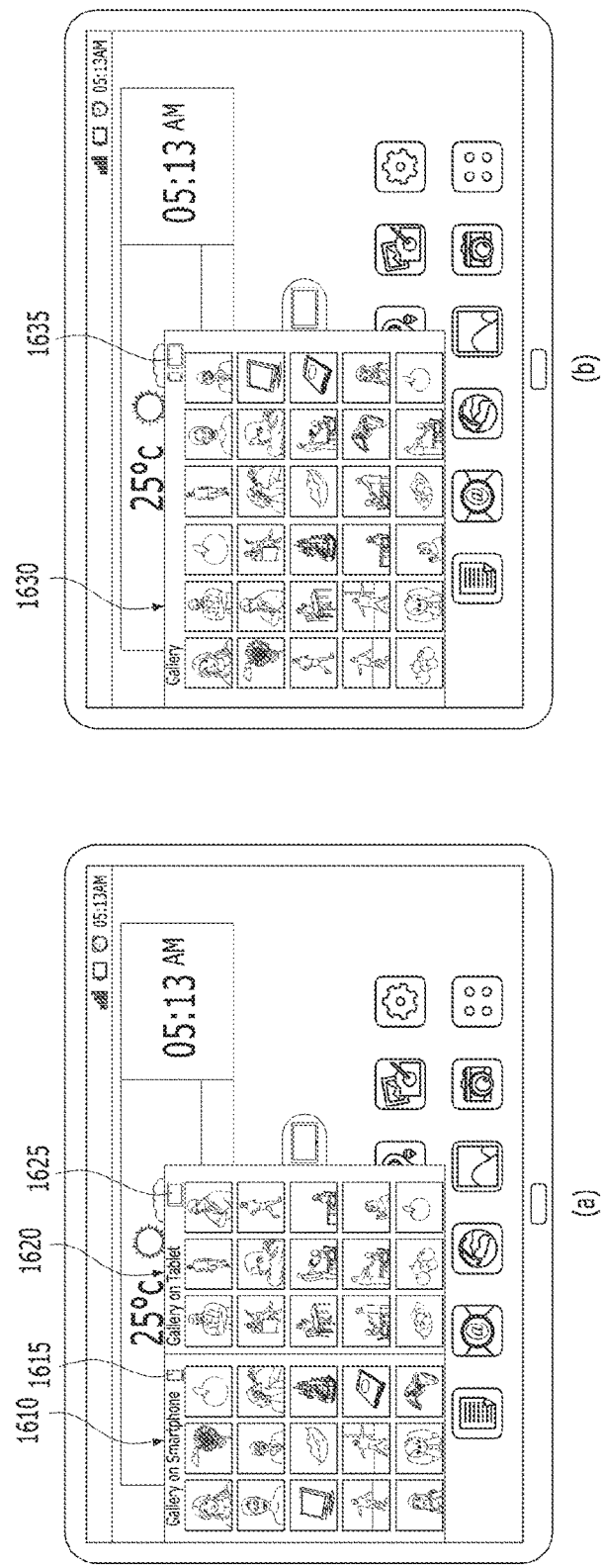
FIG. 16 is a diagram for an example of outputting content lists including identification information on each terminal.

For example, FIG. 16 is a diagram for an example of outputting content lists including identification information on each terminal. Identification information 1615 for identifying the first terminal can be outputted in a content list 1610 of the first terminal and identification information 1625 for identifying the second terminal can be outputted in a content list 1620 of the second terminal. For example, referring to FIG. 16(a), a smartphone image 1615 representing the first terminal is outputted in the content list 1610 of the first terminal and a tablet image 1625 representing the second terminal is outputted in the content list 1620 of the second terminal. A user can easily determine a device to which a corresponding image list belongs thereto by watching an image outputted via each of the content lists.

In this case, if one of the identification information 1615 of the first terminal and the identification information 1625 of the second terminal is dragged to another identification information, the second controller can configure a content list by merging the content list 1610 of the first terminal and the content list 1620 of the second terminal.

For example, if the smartphone image 1615 is dragged to the tablet image 1625 (or, if the tablet image 1625 is dragged to the smartphone image 1615), as shown in the example of FIG. 16(b), the second controller can control a content list 1630, which is configured by merging the content list 1610 of the first terminal and the content list 1620 of the second terminal, to be outputted. The merged content list 1630 can output identification information 1635 to indicate that the content list of the first terminal and the content list of the second terminal are merged. FIG. 16(b) illustrates an example of outputting an image that the smartphone image and the tablet image are merged.

If at least one of the content list of the first terminal and the content list of the second terminal is selected and the selected item is dragged to a specific icon of the second area, the second controller can control the selected item to be executed via an application corresponding to the selected icon.

Figure 17:
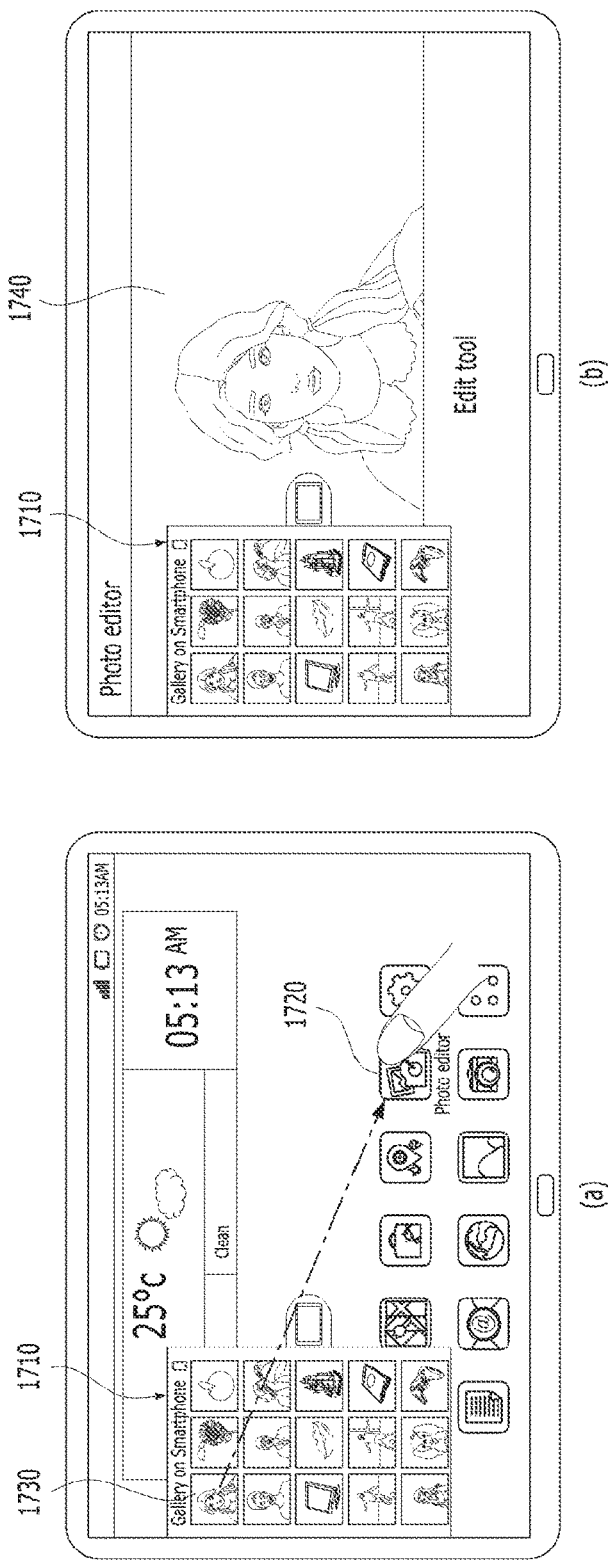
FIG. 17 is a diagram for an example of executing an item of a content list through a specific application of a second terminal.

For example, FIG. 17 is a diagram for an example of executing an item of a content list through a specific application of a second terminal. For clarity, assume that an image list 1710 of the first terminal is outputted via the second display unit.

If an image is selected from the image list 1710 of the first terminal and the selected image is dragged to a specific icon on the second area, the second controller asks the first terminal to transmit the selected image. Having received the image, the second controller can control the received image to be executed in an application corresponding to the selected icon. For example, as shown in the example of FIG. 17(*a*), if an image 1730 belonging to the image list 1710 is dragged to a photo editor icon 1720 on the second area, as shown in the example of FIG. 17(*b*), the second controller can control an image 1740 corresponding to the selected image 1730 to be a target of picture editing while executing a picture editing application.

If at least one image belonging to the image list 1710 is selected and the selected image is dragged to a message application (e.g., E-mail, instant message, text message, etc.), the second controller can control a message writing screen to which an image corresponding to the selected image is attached to be outputted.

Although FIG. 17 explains an example of an image, it is apparent that the present embodiment is also applicable to a different type of content. For example, if a document file is dragged to a document editing application, it is able to open the document file while the document editing application is executed.

When at least one of the content list of the first terminal and the content list of the second terminal is outputted [S205], if at least one item of the content list is dragged to a message writing screen on the first area or the second area [S206], the second terminal can control content corresponding to the selected item to be attached to a message written via the first area or the second area [S207]. regarding this, it shall be explained in detail with reference to drawings.

FIG. 18 is a diagram for an example of attaching contents to a message through a first area. When a message writing screen is outputted via the first area, if a first indicator is dragged to a specific icon (e.g., gallery icon) on the second area, as mentioned earlier in FIG. 13, it is able to output a content list of the first terminal. Moreover, it is able to additionally output a content list of the second terminal based on an additional input of a user.

When at least one of the content list of the first terminal and the content list of the second terminal is outputted, if at least one item is selected from the content list, the second controller can control the selected content to be attached to a message written via the first area.

For example, if a touch input (e.g., a user input for touching one item belonging to the content list or a user input for dragging one item belonging to the content list to the first area) for selecting at least one item from the content list of the first terminal is received while a message writing screen is outputted via the first area, the second controller can control content corresponding to the selected item to be attached to a message written via the first area.

For example, when an e-mail is written via the first area 1810, as shown in the example of FIG. 18(*a*), if at least one item 1830 belonging to the image list 1820 of the first terminal is dragged to the top of the first area, as shown in the example of FIG. 18(*b*), the second controller can control an image 1840 corresponding to the selected item to be attached to the e-mail written via the first area 1810.

Although it is not depicted, if at least one item selected from the image list of the second terminal is dragged to the top of the second area, the second controller can control the dragged item to be attached to an e-mail written via the first area. To this end, the second controller can transmit an image corresponding to the item selected by a user from the image list of the second terminal to the first terminal. Having received the image, the first terminal attaches the image to the message.

FIG. 19 is a diagram for an example of attaching contents to a message through a second area. If a file attach icon is dragged to a first indicator while a message writing screen is outputted via the second area, as mentioned earlier in FIG. 14, it is able to output the content list of the first terminal. Moreover, it is able to additionally output the content list of the second terminal by inputting an additional input of a user.

If at least one item belonging to the content list is completed while at least one of the content list of the first terminal and the content list of the second terminal is outputted, the second controller can control a selected content to be attached to a message written via the second area.

For example, if a touch input (e.g., a user input for touching one item belonging to the content list or a user input for dragging one item belonging to the content list to the second area) for selecting at least one item from the content list of the first terminal is received while a message writing screen is outputted via the second area, the second controller can control content corresponding to the selected item to be attached to a message written via the second area.

For example, when an e-mail is written via the second area 1910, as shown in the example of FIG. 19(*a*), if at least one item 1930 belonging to the image list 1920 of the first terminal is dragged to the top of the second area 1920, as shown in the example of FIG. 19(*b*), the second controller can control an image 1940 corresponding to the dragged item 1930 to be attached to the e-mail written via the second area 1910.

Although it is not depicted, if at least one item selected from the image list of the second terminal is dragged to the top of the second area, the second controller can control the dragged image to be attached to an e-mail written via the second area.

If an image of the image list is dragged to a photo edit icon, as mentioned earlier in FIG. 17, it is able to output an editing screen for editing the image. In this case, if a message writing screen is outputted via the first area or the second area, the second controller can control an edited image to be automatically attached to a message written via the first area or the second area.

Figure 20:
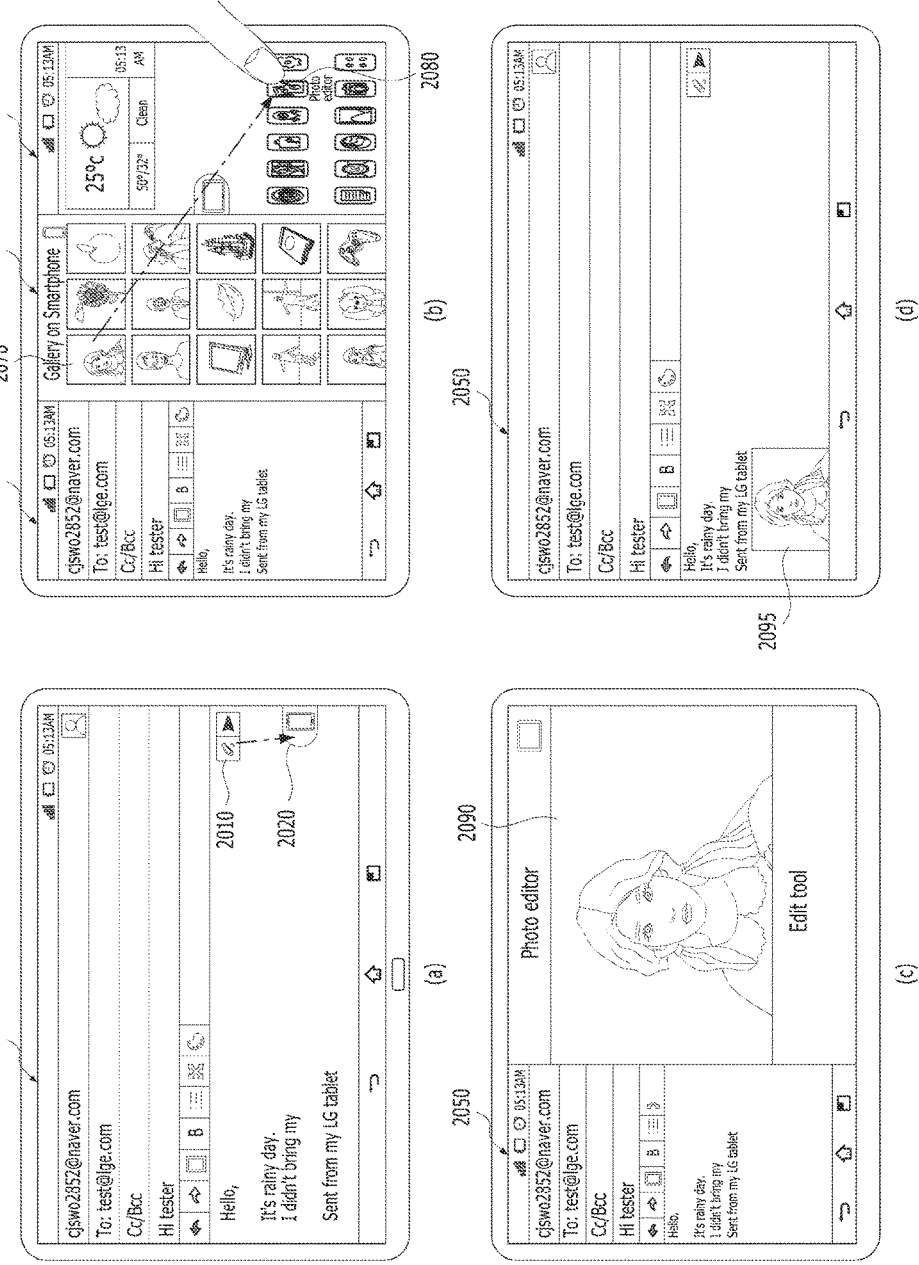
FIG. 20 is a diagram for an example of attaching an edited image to a message via a first area or a second area.

For example, FIG. 20 is a diagram for an example of attaching an edited image to a message via a first area or a second area.

When an image is written via the second area, if a file attach icon 2010 is dragged to the top of a first indicator 2020, the second controller can control a content list 2030 of the first terminal to be outputted. In this case, if the content list of the first terminal is outputted, the second controller can control a home screen of the second terminal or a list of applications installed in the second terminal to be additionally outputted while continuously outputting a message writing screen 2050. For example, referring to FIGS. 20(*a*)

and (b), if the content list 2030 of the first terminal is outputted, the home screen 2040 of the second terminal can be additionally outputted.

Subsequently, if at least one item 2070 belonging to the first content list 2030 is dragged to a photo edit icon 2080, the second controller executes a photo editing application and may be able to control an image 2090 corresponding to the selected item to be opened in the photo editing application. Hence, as shown in the example of FIG. 20(c), an editing screen of the selected image can be outputted via the second display unit.

Subsequently, if the editing of the image is completed, the second controller can control the edited image 2095 to be attached to a message written via the second area.

Although it is not depicted, if an editing screen of a specific image is outputted while a message writing screen is outputted via the first area, the second controller can control an edited image to be attached to a message written via the first area.

In the foregoing examples, a message includes not only an e-mail, an instant message, a text message (e.g., SMS, LMS, and MMS), and the like written for the purpose of being transmitted to a different terminal but also all types of document media capable of being attached in a mobile terminal including SNS posting, a memo, a document, a schedule, and the like.

If one of an icon displayed via the first area and an icon displayed via the second area is dragged to an icon of the same type displayed on a different area, the second controller can control a task currently performed in a prescribed application installed in one of the first terminal and the second terminal to be copied to a prescribed application installed in another terminal.

Figure 21:
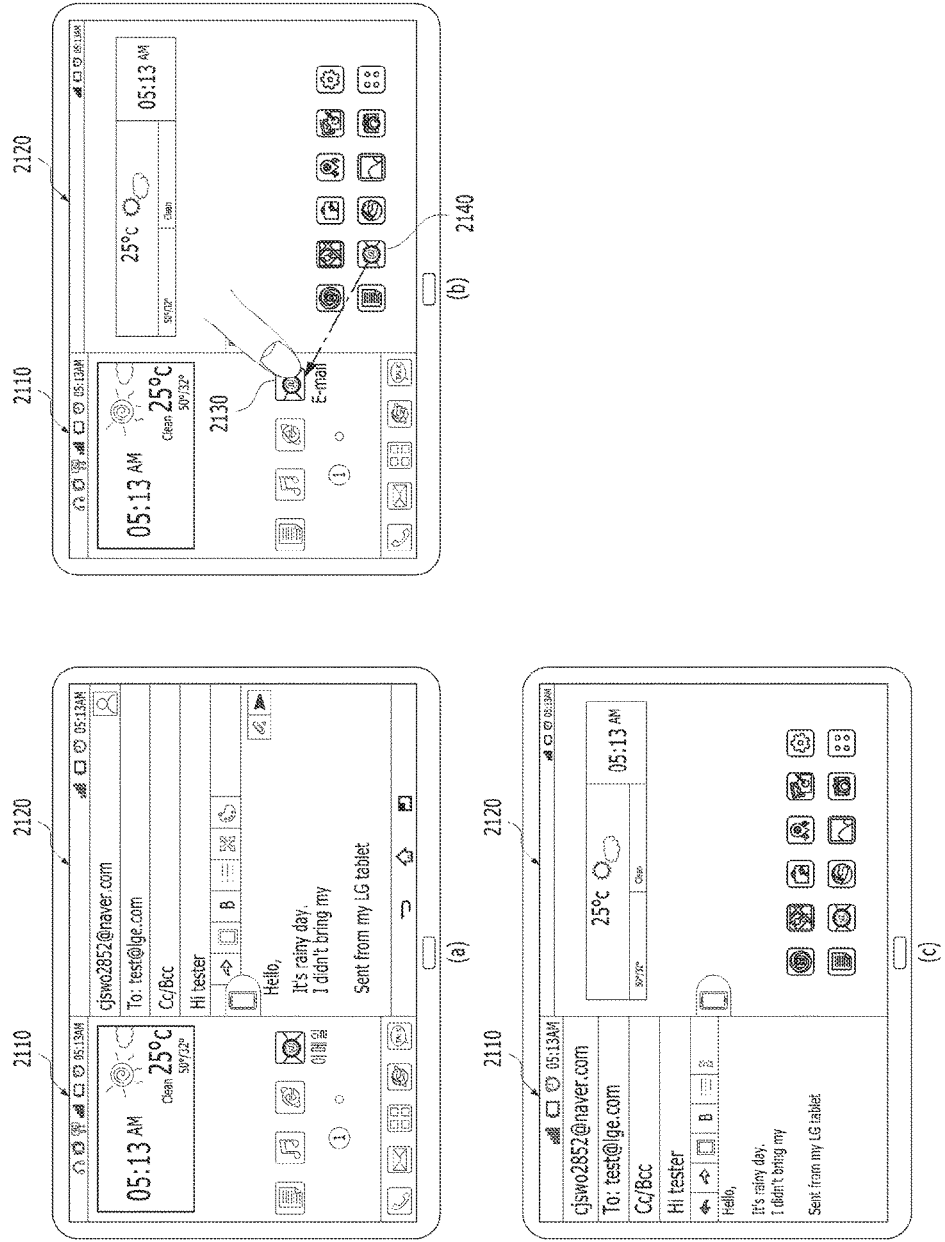
FIG. 21 is a diagram for an example of copying a task currently performed in a terminal to another terminal.

For example, FIG. 21 is a diagram for an example of copying a task currently performed in a terminal to another terminal.

As shown in the example of FIG. 21(a), if a prescribed user input (e.g., a user input for pushing a home button) is received while an e-mail is written via a second area 2120, the second controller stops writing the e-mail and can control the home screen to be outputted via the second area 2120. In this case, as shown in the example of FIG. 21(b), if an e-mail icon 2140 outputted via the second area 2120 is dragged to an e-mail icon 2130 of a first area 2110, the second controller can transmit e-mail content, which is used to be written via the second area 2120, to the first terminal.

Subsequently, if the e-mail icon 2130 outputted via the first area 2110 is touched, as shown in the example of FIG. 21(c), an e-mail writing screen including content identical to the content, which is used to be written via the second area 2120, can be outputted via the first area 2110. Hence, a user can continuously write the e-mail, which used to be written in the second terminal, in the first terminal. Although wireless communication between the first terminal and the second terminal is terminated, the user can continuously write the e-mail in the first terminal.

Although it is not depicted, if a prescribed icon outputted via the first area 2110 is dragged to an icon of the same type outputted via the second area 2120, a task currently performed in the first terminal can be transmitted to the second terminal.

Although the e-mail is explained as an example in the drawing, the first and the second terminal can exchange a task of all types of data capable of being handled by a terminal.

FIG. 21 shows an example that a task of an application is copied only when icons of the same type outputted via the first area and the second area are mutually selected. Although an application icon is dragged to a first indicator (or, a second indicator), the second controller can control a task of a prescribed application to be copied.

Figure 22:
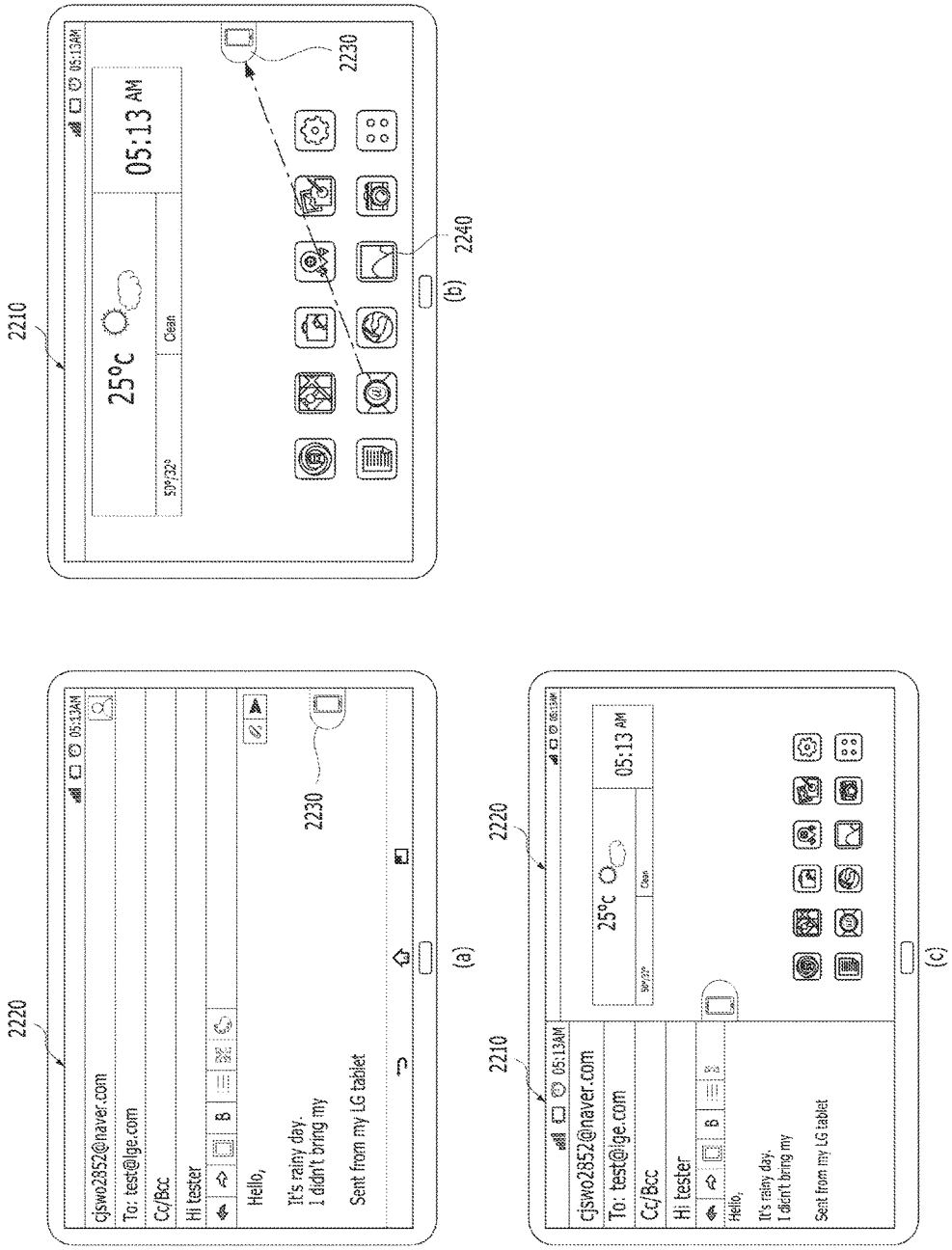
FIG. 22 is a diagram for a different example of copying a task currently performed in a terminal to another terminal.

For example, FIG. 22 is a diagram for a different example of copying a task currently performed in a terminal to another terminal.

As shown in the example of FIG. 22(a), if a prescribed user input (e.g., a user input for pushing a home button) is received while an e-mail is written via a second area 2220, the second controller stops writing the e-mail and can control the home screen to be outputted via the second area 2220. In this case, as shown in the example of FIG. 22(b), if an e-mail icon 2240 outputted via the second area 2220 is dragged to the first indicator 2230, the second controller can transmit e-mail content, which is used to be written via the second area 2220, to the first terminal.

Subsequently, if the e-mail icon 2150 outputted via the first area 2210 is touched, as shown in the example of FIG. 22(c), an e-mail writing screen including content identical to the content, which is used to be written via the second area 2220, can be outputted via the first area 2210.

Although it is not depicted, if an icon outputted via the first area is dragged to a first indicator (or, a second indicator), a task currently performed in the first terminal can be copied to the second terminal.

According to one embodiment of the present invention, the aforementioned method (operation flowchart) can be implemented with a code readable by a processor in a recording media in which a program (or, an application) is recorded. The examples of the recording media readable by the processor may include a ROM, a RAM, a CD-ROM, a magnetic tape, a floppy disc, an optical data storing device and the like. And, implementing in a form of a carrier wave (e.g., transmission via the internet and the like) is also included.

The mobile terminal 100 disclosed in the present specification are not restricted by the configuration and the method of the aforementioned embodiments. In order to make various modifications from the embodiments, all or a part of each embodiment can be configured in a manner of being selectively combined.

INDUSTRIAL APPLICABILITY

The present invention can be applied to various types of electronic devices capable of communicating with a different terminal.

What is claimed is:

1. A first mobile terminal performing wireless communication with a second mobile terminal, the first mobile terminal comprising:
a wireless communication unit configured to perform the wireless communication;
a display unit configured to display information on a plurality of areas; and
a controller configured to:
control the wireless communication unit to receive first information from the second mobile terminal;
control the display unit to display a first list including the received first information on a first of the plurality of areas;
control the display to display a second list including second information related to the first mobile terminal on a second of the plurality of areas;
detect selection of information from at least the displayed first list or the displayed second list; and attach the selected information to a message written via the first or the second of the plurality of areas.

2. The mobile terminal of claim 1, wherein the controller is further configured to:
control the display unit to display a first indicator to indicate that the wireless communication is performed;
detect a touch input on the displayed first indicator; and
control the display unit to initiate display of the first list upon detecting the touch input.

3. The mobile terminal of claim 2, wherein the controller is further configured to control the display unit to adjust a size of the first of the plurality of areas based on a detected displacement in a specific direction of the detected touch input.

4. The mobile terminal of claim 3, wherein the controller is further configured to:
control the display unit to display a second indicator if a size of the first of the plurality of areas increases to equal to or greater than a predetermined value;
detect a touch input on the displayed second indicator; and
control the display unit to no longer display the first of the plurality of areas and to display the second of the plurality of areas as a full-screen display in response to detecting the touch input on the second indicator.

5. The mobile terminal of claim 4, wherein the controller is further configured to control the display unit to display a first image identifying the second mobile terminal on the displayed first indicator and to display a second image identifying the first mobile terminal on the displayed second indicator.

6. The mobile terminal of claim 1, wherein the controller is further configured to:
detect selection and dragging of at least one item from the displayed first list to the second of the plurality of areas; and
control the wireless communication unit to receive information corresponding to the selected at least one item from the second mobile terminal and to attach the received information to a message written via the second of the plurality of areas.

7. The mobile terminal of claim 1, wherein the controller is further configured to:
detect selection and dragging of at least one item from the displayed second list to the first of the plurality of areas;
control the wireless communication unit to transmit information corresponding to the selected at least one item to the second mobile terminal; and
attach the transmitted information to a message written via the first of the plurality of areas.

8. The mobile terminal of claim 1, wherein the controller is further configured to:
detect selection and dragging of information from the displayed first list or the displayed second list to an icon corresponding to an application of the second of the plurality of areas; and
execute the corresponding application using content corresponding to the selected information.

9. The mobile terminal of claim 1, wherein the controller is further configured to:
detect dragging of either a first indicator on the display indicating that the first mobile terminal wirelessly communicates with the second mobile terminal to an object in the second of the plurality of areas or dragging of the object in the second of the plurality of areas to the first indicator; and control the display unit to display the first list in response to the detected dragging.

10. The mobile terminal of claim 9, wherein the controller is further configured to:
detect a touch input received while the first list is displayed; and
control the display unit to display the second list in addition to the first list.

11. The mobile terminal of claim 10, wherein the controller is further configured to control the display unit to:
display first identification information related to the second mobile terminal via the displayed first list; and
display second identification information related to the first mobile terminal via the displayed second list.

12. The mobile terminal of claim 11, wherein the controller is further configured to:
detect dragging of the first identification information or the second identification information to third identification information; and
control the display unit to display a third list by merging the displayed first list and the displayed second list.

13. The mobile terminal of claim 1, further comprising a sensing unit configured to sense inclination of the first mobile terminal, wherein the controller is further configured to:
detect rotation of the first mobile terminal from a landscape orientation to a portrait orientation or from a portrait orientation to a landscape orientation; and
control the display unit to adjust the first of the plurality of areas to a predetermined size.

14. The mobile terminal of claim 1, wherein:
the first of the plurality of areas is displayed such that the first of the plurality of areas partially overlaps the second of the plurality of areas; and
the first information is displayed on a portion of the first of the plurality of areas and the second information is displayed on a portion of the second of the plurality of areas that do not overlap.

15. The mobile terminal of claim 1, further comprising a sensing unit configured to sense an inclination of the first mobile terminal, wherein the controller is further configured to:
detect rotation of the first mobile terminal from a landscape orientation to a portrait orientation or from a portrait orientation to a landscape orientation; and
control the display unit to display the first of the plurality of areas and the second of the plurality of areas such that the first of the plurality of areas partially overlaps the second of the plurality of areas and to display the second information on a portion of the second of the plurality of areas that is not overlapped.

16. The mobile terminal of claim 1 wherein the controller is further configured to:
detect dragging of an icon of a same type between the first of the plurality of areas and the second of the plurality of areas; and
control an application of the first mobile terminal corresponding to the icon to share a task with the second mobile terminal.

17. The mobile terminal of claim 1, wherein the controller is further configured to:
control the display unit to display an indicator to indicate that the wireless communication is performed;
detect dragging of an icon from the either the first of the plurality of areas or the second of the plurality of areas to the displayed indicator; and control an application of the first mobile terminal corresponding to the dragged icon to share a task with the second mobile terminal.

18. A method of a first mobile terminal performing wireless communication with a second mobile terminal, the method comprising:

establishing a wireless communication channel with the second mobile terminal;

receiving first information from the second mobile terminal;

displaying a first list including the received first information on a first area of a display;

displaying a second list including second information related to the first mobile terminal on a second of the display;

detecting selection of information from at least the displayed first list or the displayed second list; and attaching the selected information to a message written via the first or the second of the display.

19. The method of claim 18, further comprising:

displaying a first indicator to indicate that wireless communication is performed;

detecting a touch input on the displayed first indicator; and initiating display of the first list including the first information upon detecting the touch input.

20. The method of claim 18, further comprising:

detecting rotation of the first mobile terminal from a landscape orientation to a portrait orientation or from a portrait orientation to a landscape orientation;

displaying the first area and the second area such that the first area partially overlaps the second area; and displaying the second information on a portion of the second area that is not overlapped.

\* \* \* \* \*